(12) United States Patent
Blaha, Jr.

(10) Patent No.: US 11,940,306 B2
(45) Date of Patent: Mar. 26, 2024

(54) ESTIMATION OF THE LOCATION OF A WIRELESS TERMINAL, BASED ON A PROPAGATION CHARACTERISTIC OF A PRESSURE WAVE

(71) Applicant: Polaris Wireless, Inc., Mountain View, CA (US)

(72) Inventor: Jerome Arthur Blaha, Jr., Redwood City, CA (US)

(*) Notice: Subject to any disclaimer, the term of this patent is extended or adjusted under 35 U.S.C. 154(b) by 284 days.

(21) Appl. No.: 17/226,833

(22) Filed: Apr. 9, 2021

(65) Prior Publication Data
US 2021/0293586 A1    Sep. 23, 2021

Related U.S. Application Data

(62) Division of application No. 15/791,395, filed on Oct. 23, 2017, now Pat. No. 11,009,376.

(51) Int. Cl.
| | | |
|---|---|---|
| *G01D 5/42* | (2006.01) | |
| *G01L 19/08* | (2006.01) | |
| *G01S 5/00* | (2006.01) | |
| *H04W 4/02* | (2018.01) | |
| *H04W 4/33* | (2018.01) | |

(52) U.S. Cl.
CPC .............. *G01D 5/42* (2013.01); *G01L 19/086* (2013.01); *G01S 5/012* (2020.05); *G01S 5/018* (2020.05); *H04W 4/02* (2013.01); *H04W 4/33* (2018.02)

(58) Field of Classification Search
CPC ......... G01D 5/42; G01L 19/086; G01S 5/012; G01S 5/018; G01S 5/0278; H04W 4/02; H04W 4/33
See application file for complete search history.

(56) References Cited

U.S. PATENT DOCUMENTS

| | | |
|---|---|---|
| 5,979,217 A | 11/1999 | Wallrafen |
| 7,162,368 B2 | 1/2007 | Levi et al. |
| 7,763,179 B2 | 7/2010 | Levy et al. |
| 9,198,004 B2 | 11/2015 | Das et al. |
| 9,329,036 B2 | 5/2016 | Garin et al. |
| 9,939,264 B2 | 4/2018 | Barfield et al. |

(Continued)

OTHER PUBLICATIONS

Notice of Allowance issued in U.S. Appl. No. 16/790,111, dated Nov. 4, 2021.

(Continued)

*Primary Examiner* — Thien M Le
*Assistant Examiner* — Asifa Habib
(74) *Attorney, Agent, or Firm* — McGeary Cukor LLC; Kenneth Ottesen; Jason Paul Demont

(57) ABSTRACT

A method for estimating the location of a wireless terminal at an unknown location, such as within a building. A location engine using the disclosed method receives and uses samples of barometric pressure measured by the wireless terminal to generate a characterization of a pressure wave in the vicinity of the wireless terminal. The location engine generates an estimate of the location of the wireless terminal based on the characterization of the pressure wave and, in some cases, the location of the source of the pressure wave, such as a building's door that is opening or closing. The location engine also bases the estimate of the wireless terminal's location on a propagation characteristic of the pressure wave, such as its speed of propagation.

17 Claims, 20 Drawing Sheets

(56) References Cited

U.S. PATENT DOCUMENTS

| | | |
|---|---|---|
| 10,390,184 B2 | 8/2019 | Lakshmi Narayanan et al. |
| 10,757,540 B1 | 8/2020 | Klinkner et al. |
| 2007/0218823 A1 | 9/2007 | Wolf |
| 2009/0217754 A1 | 9/2009 | Binda et al. |
| 2012/0013475 A1 | 1/2012 | Farley et al. |
| 2012/0046792 A1 | 2/2012 | Secor |
| 2012/0072110 A1 | 3/2012 | Venkatraman |
| 2013/0133421 A1 | 5/2013 | Katz |
| 2013/0205306 A1 | 8/2013 | Kelly |
| 2014/0011540 A1 | 1/2014 | Miyake |
| 2014/0012529 A1 | 1/2014 | Lee et al. |
| 2014/0122012 A1 | 5/2014 | Barfield |
| 2014/0323160 A1 | 10/2014 | Venkatraman et al. |
| 2014/0324381 A1 | 10/2014 | Venkatraman et al. |
| 2015/0153171 A1 | 6/2015 | Zhou et al. |
| 2015/0192414 A1 | 7/2015 | Das et al. |
| 2016/0047648 A1 | 2/2016 | Edge et al. |
| 2016/0102995 A1* | 4/2016 | Gum .............. H04W 4/029 702/98 |
| 2016/0245716 A1 | 8/2016 | Gum et al. |
| 2017/0225921 A1 | 8/2017 | Scoville et al. |
| 2018/0073951 A1 | 3/2018 | Venkatraman et al. |
| 2019/0120665 A1 | 4/2019 | Blaha, Jr. |

OTHER PUBLICATIONS

Office action issued in U.S. Appl. No. 16/790,111, dated Sep. 29, 2021.

Notice of Allowance in U.S. Appl. No. 15/791,397, dated Feb. 10, 2020.

Office action issued in U.S. Appl. No. 15/791,397, dated Nov. 26, 2019.

M. Wu, P.H. Pathak, and P. Mohaptra, "Monitoring Building Door Events Using Barometer Sensor in Smartphones," UBICOMP '15, Sep. 7-11, Osaka, Japan, pp. 319-323.

Notice of Allowance in U.S. Appl. No. 15/791,395, dated Feb. 8, 2021.

Office action in U.S. Appl. No. 15/791,395, dated Oct. 29, 2020.

Office action issued in U.S. Appl. No. 15/791,395, dated May 8, 2020.

Restriction Requirement issued in U.S. Appl. No. 15/791,395, dated Feb. 21, 2020.

\* cited by examiner

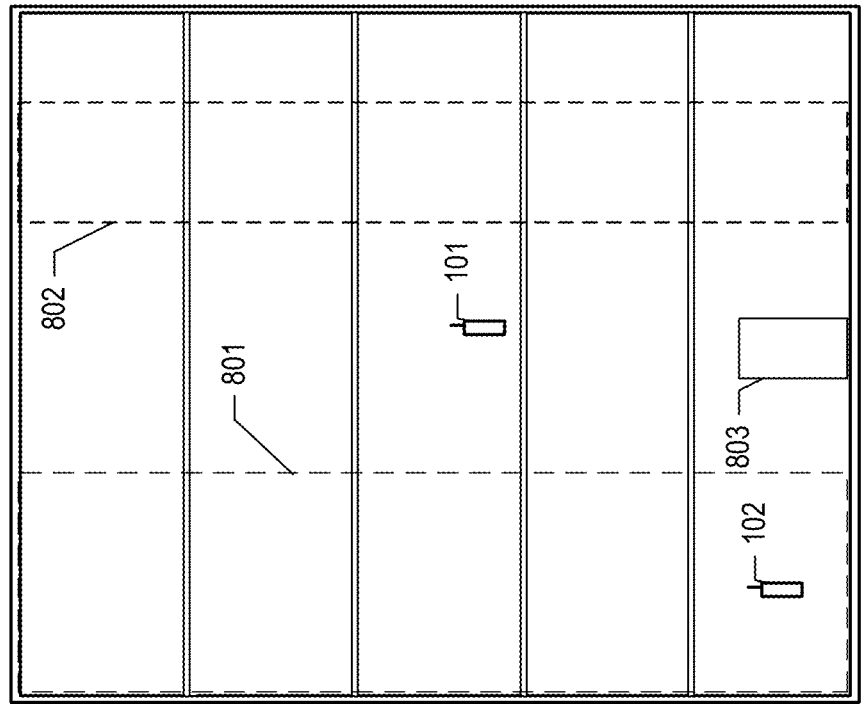
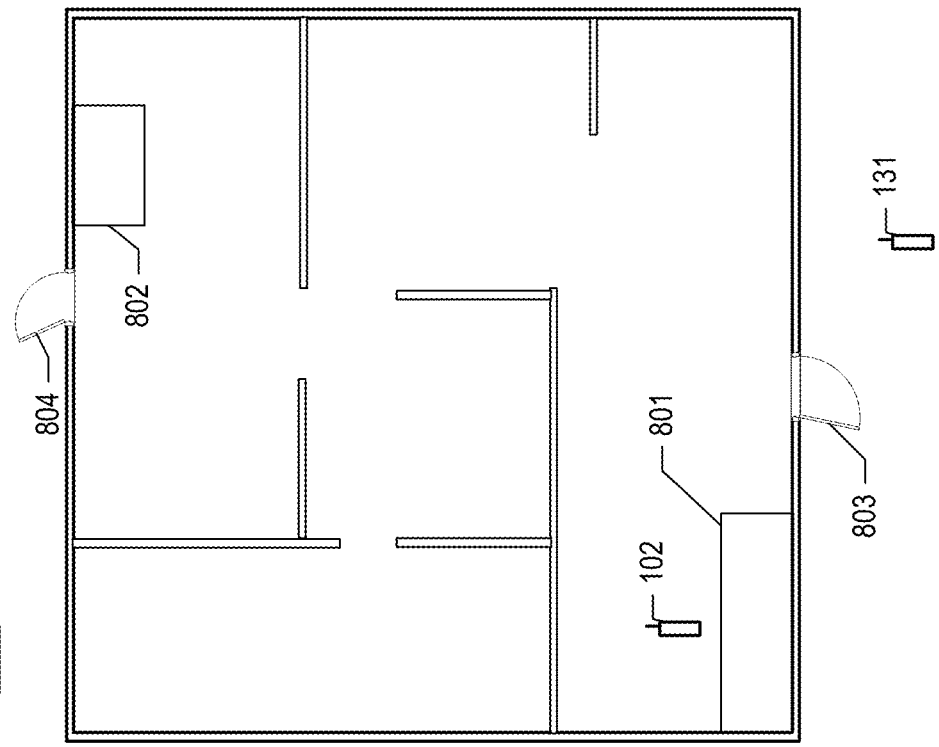

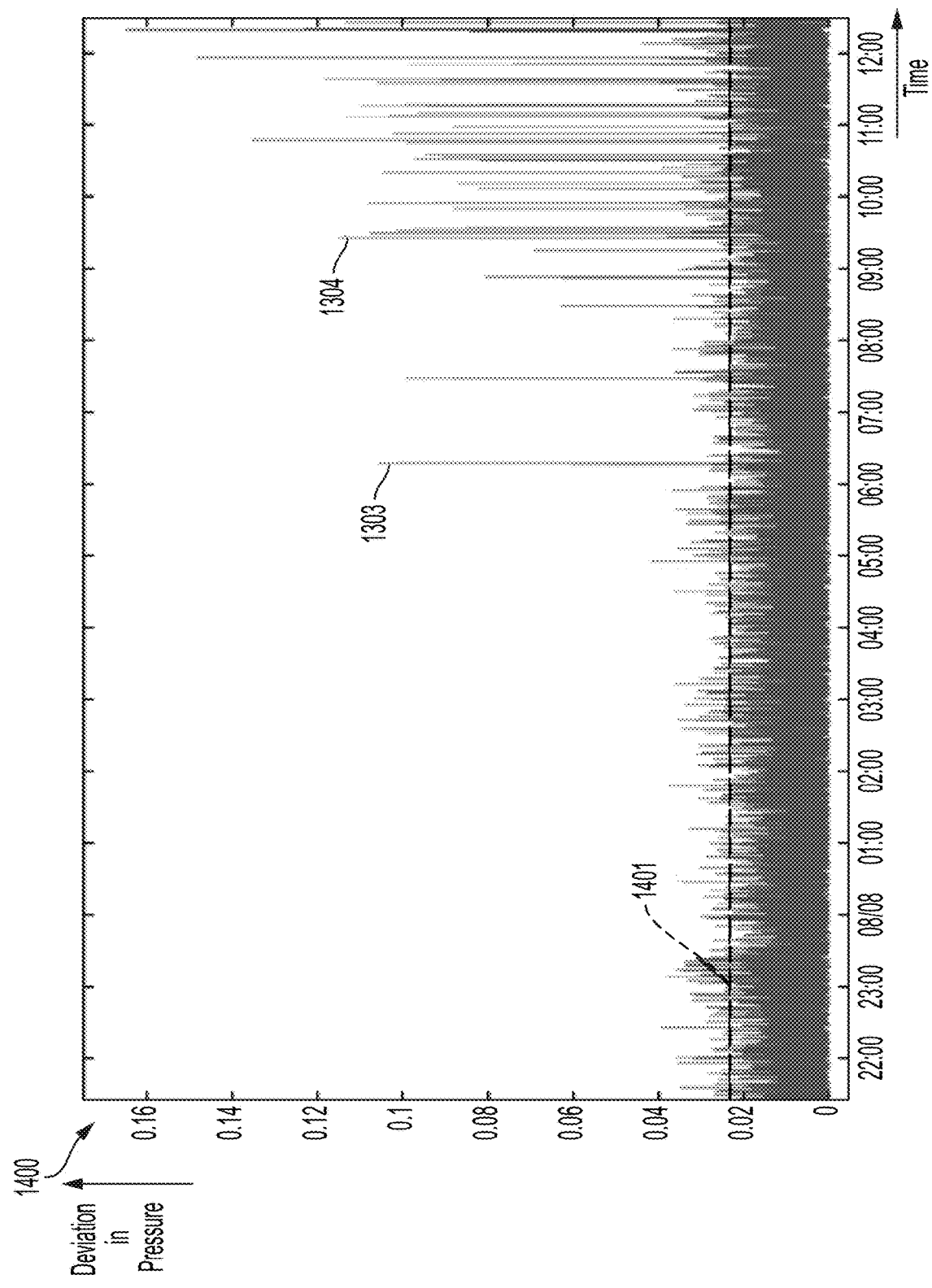

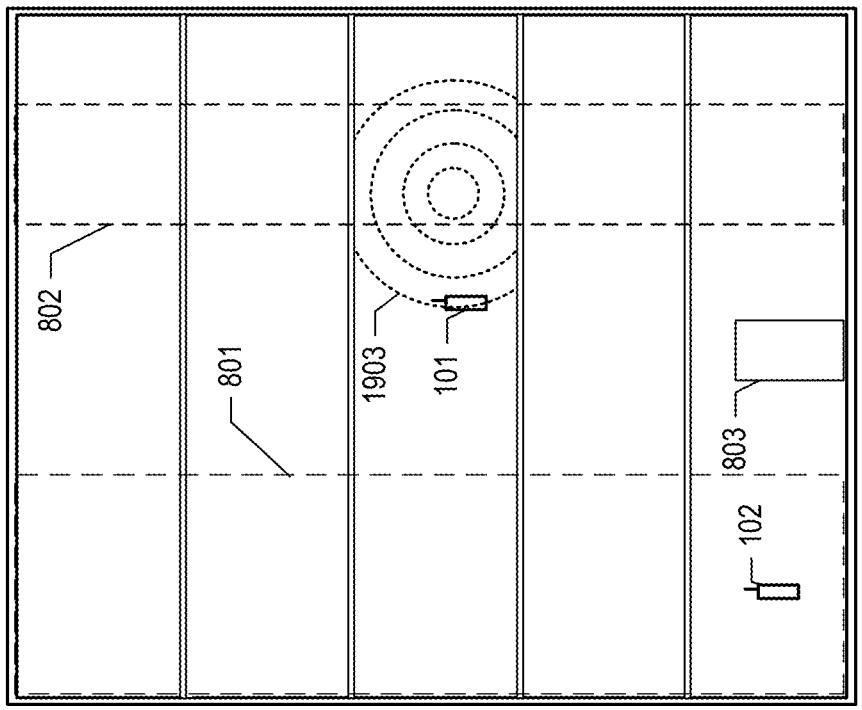
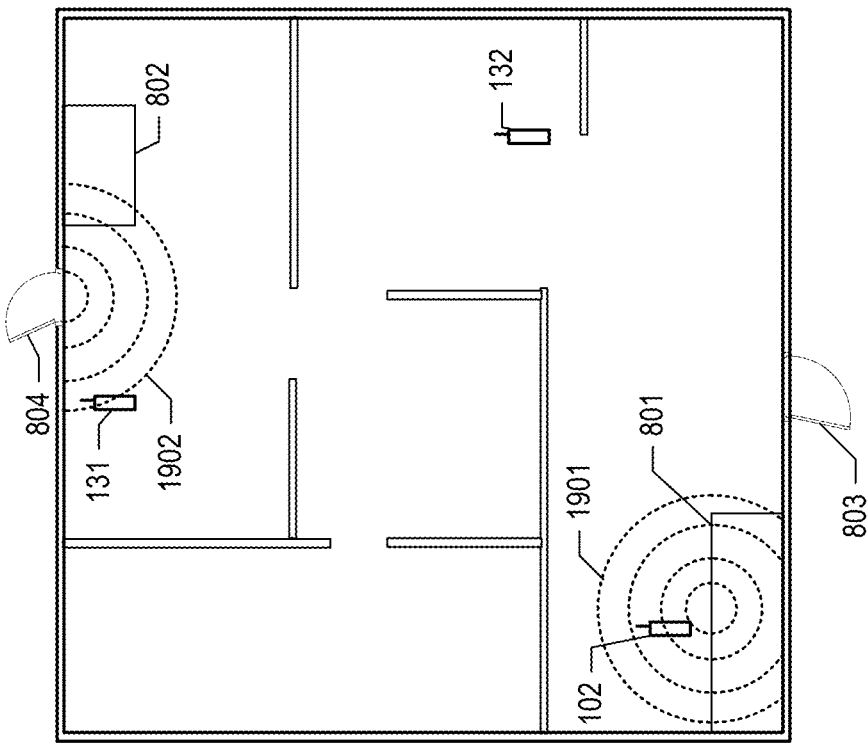

ESTIMATION OF THE LOCATION OF A WIRELESS TERMINAL, BASED ON A PROPAGATION CHARACTERISTIC OF A PRESSURE WAVE

CROSS REFERENCE TO RELATED APPLICATIONS

This application is related to "Detection Of The Occurrence Of An Event, Based On Barometric Pressure Measurements," application Ser. No. 15/791,397, which is incorporated by reference herein in its entirety. This application is also related to "Estimation Of The Location Of A Wireless Terminal, Based On Characterizing A Pressure Wave," U.S. application Ser. No. 15/791,395, incorporated by reference herein.

This application is related to U.S. Pat. Nos. 6,518,918, 6,944,465, 7,460,505, 7,383,051, 7,257,414, 7,753,278, 7,433,695, 7,848,762, and 8,306,676, 8,630,665, and 9,332,389, each of which is incorporated by reference herein.

This application is related to U.S. Patent Application Publications 2008/0077356, 2008/0077472, and 2008/0077516, each of which is incorporated by reference herein.

FIELD OF THE INVENTION

The present invention relates to telecommunications in general, and, more particularly, to a technique for estimating the location of a wireless terminal based on characterizing a pressure wave of the air in the vicinity of the wireless terminal.

BACKGROUND OF THE INVENTION

The salient advantage of wireless telecommunications over wireline telecommunications is the user of the wireless terminal is afforded the opportunity to use his or her terminal anywhere. On the other hand, the salient disadvantage of wireless telecommunications lies in that fact that because the user is mobile, an interested party might not be able to readily ascertain the location of the user.

Such interested parties might include both the user of the wireless terminal and a remote party. There are a variety of reasons why the user of a wireless terminal might be interested in knowing his or her location. For example, the user might be interested in telling a remote party where he or she is or, alternatively, the user might seek advice in navigation.

In addition, there are a variety of reasons why a remote party might be interested in knowing the location of the user. For example, the recipient of an E 9-1-1 emergency call from a wireless terminal might be interested in knowing the location of the wireless terminal so that emergency services or service vehicles can be dispatched to that location.

There are many techniques in the prior art for estimating the location of a wireless terminal. In accordance with some techniques, the location of a wireless terminal is estimated, at least in part, from signal measurements that are reported by the wireless terminal. The reported measurements are of signals measured by the wireless terminal that are transmitted by one or more base stations and, in some cases, by Global Positioning System (GPS) satellites. In order for these techniques to work, at least some of the transmitted signals have to be strong enough to allow for accurate measurement by the wireless terminal and for reliable processing by the particular estimation technique. Some of these techniques work well even in environments where the measured strengths of the different signals vary significantly, such as where signal obstructions are present, including natural obstructions such as mountains and artificial obstructions such as buildings.

In some environments, however, signals that are too weak to be usable and environmental conditions that are insufficiently or incorrectly characterized can cause at least some location estimation techniques to produce unreliable location estimates. For example, some indoor environments can cause such problems to occur. Therefore, the need exists for a technique for estimating the location of a wireless terminal in a wireless telecommunications environment that includes both indoor and outdoor areas.

SUMMARY OF THE INVENTION

There are a number of systems in the prior art for estimating the location of a wireless terminal. Several of the factors that affect the accuracy of the estimate are:
1. whether the signals that travel to and from the wireless terminal are impaired (e.g., attenuated, reflected, refracted, etc.) or not,
2. whether the system knows if the signals have been impaired or not, and
3. whether the system compensates for the impairment or not.

When the system knows that the signals have been impaired and compensates for the impairment, the accuracy of the estimate can be very good. In contrast, when the system does not know that the signals have been impaired or does not compensate for the impairment, the accuracy of the estimate can be very bad. The military, police, and emergency services often rely on the estimates to be good, and a bad estimate can have serious consequences.

Signals can be impaired by natural objects such as mountains and by artificial objects such as buildings. The impairment caused when a wireless terminal is indoors is particularly subtle, and it is particularly difficult to know that the wireless terminal is indoors, in at least some techniques in the prior art.

To address this problem, embodiments of the present invention estimate whether a wireless terminal is indoors or outdoors. Although it is trivial for a human to know whether he or she is indoors or outdoors, and it might seem that it should be simple for a machine to know whether it is indoors or not, it has been a difficult problem in the prior art.

A location engine of the present invention estimates whether the wireless terminal is indoors or not by analyzing the barometric pressure in the vicinity of the wireless terminal. The inventor of the present invention recognized that the barometric sensor on various wireless terminals, such as smartphones, is capable of measuring very subtle changes in the atmospheric pressure. The inventor had the additional insight of, when accumulating such measurements within a building, how some of the measured changes in the atmospheric pressure correlated to various events that occur within the building or other defined area. For example, the inventor realized that an entry door opening and closing produces a pressure wave having a particular transient that is perceptible by a smartphone, accounting for the delay of the pressure wave propagating from the entry door to the smartphone elsewhere in the building. The changes in atmospheric pressure caused by these types of events are generally imperceptible to humans.

In contrast, a wireless terminal that is positioned outside of any building is unlikely to measure a change in atmospheric pressure attributed to an entry door opening and closing, even of that of a nearby building. This is mainly due to the outside environment surrounding the wireless terminal not being a closed space, in contrast to the space inside a building. In other words, a transient in atmospheric pressure attributed to a particular source is detectable in some environments while not being present, or detectable, in others. Thus, a location engine of an illustrative embodiment can infer a probability that a wireless terminal is indoors based on a characterization of the pressure wave in the vicinity of the wireless terminal, wherein the characterization is generated from barometric pressure measurements made by the wireless terminal.

The location engine of the illustrative embodiment uses a correlation that exists between i) the presence of a transient in the characterization of a pressure wave in the vicinity of a wireless terminal and ii) whether the wireless terminal is indoors or not. Transients in pressure waves are often present and detectable indoors but not outdoors. By accounting for the transients being detected or not being detected in the vicinity of the wireless terminal, the disclosed technique is able to estimate whether the wireless terminal is indoors.

In some embodiments of the present invention, the location engine can generate an estimate of the location of the wireless terminal based on knowing the location of the source of the pressure wave, such as the entry door that is opening and closing. The location engine can also generate the location estimate and/or the distance of the wireless terminal from the source based on the time at which a predetermined feature, such as a transient, is present in the pressure wave, in relation to the time at which a predetermined event occurs, such as an entry door opening and closing.

A first illustrative method of estimating the probability that a wireless terminal is indoors comprises: receiving, by a data-processing system, a sample of barometric pressure measured at a first wireless terminal; generating, by the data-processing system, a characterization of a pressure wave in the vicinity of the first wireless terminal based on the sample of barometric pressure measured at the first wireless terminal; and generating, by the data-processing system, an estimate of the probability that the first wireless terminal is indoors based on: the characterization of the pressure wave in the vicinity of the first wireless terminal.

A second illustrative method of estimating the location of a wireless terminal comprises: receiving, by a data processing system, the identity of a radio signal that is received by a wireless terminal; receiving, by the data processing system, a sample of barometric pressure measured at the wireless terminal; generating, by the data-processing system, a characterization of a pressure wave in the vicinity of the wireless terminal based on the sample of barometric pressure measured at the wireless terminal; designating at least one of a plurality of possible locations of the wireless terminal as improbable based on: whether a predetermined feature is present in the characterization of the pressure wave; and estimating the location of the wireless terminal to be one of the plurality of possible locations of the wireless terminal not designated as improbable based on: the identity of the radio signal.

A third illustrative method of estimating the location of a wireless terminal comprises: receiving, by a data processing system, a measurement of a location-dependent trait of a radio signal as received by a wireless terminal; receiving, by the data processing system, a sample of barometric pressure measured at the wireless terminal; generating, by the data-processing system, a characterization of a pressure wave in the vicinity of the wireless terminal based on the sample of barometric pressure measured at the wireless terminal; designating at least one of a plurality of possible locations of the wireless terminal as improbable based on: whether a predetermined feature is present in the characterization of the pressure wave; and estimating the location of the wireless terminal to be one of the plurality of possible locations of the wireless terminal not designated as improbable based on: the measurement of the location-dependent trait of the radio signal.

A fourth illustrative method of estimating the location of a wireless terminal comprises: receiving, by a data processing system, a measurement of a difference of a location-dependent trait of: 1) a first radio signal as received by a wireless terminal, wherein the first radio signal is transmitted by a first transmitter at a first location, and 2) a second radio signal as received by the wireless terminal, wherein the second radio signal is transmitted by a second transmitter at a second location, and receiving, by the data processing system, a sample of barometric pressure measured at the wireless terminal; generating, by the data-processing system, a characterization of a pressure wave in the vicinity of the wireless terminal based on the sample of barometric pressure measured at the wireless terminal; designating at least one of a plurality of possible locations of the wireless terminal as improbable based on: whether a predetermined feature is present in the characterization of the pressure wave; and estimating the location of the wireless terminal to be one of the plurality of possible locations of the wireless terminal not designated as improbable based on: the measurement of the difference of the location-dependent trait.

A fifth illustrative method of estimating the location of a wireless terminal comprises: receiving, by a data processing system, a sample of barometric pressure measured at a wireless terminal; generating, by the data-processing system, a characterization of a pressure wave in the vicinity of the wireless terminal based on the sample; and generating, by the data-processing system, an estimate of the location of the wireless terminal based on: i) the characterization of the pressure wave in the vicinity of the wireless terminal, and ii) the location at which a predetermined event occurs that causes the pressure wave.

BRIEF DESCRIPTION OF THE DRAWINGS

FIGS. 8A and 8B depict respective maps of the ground floor and cross sections of the multiple floors of square building 602.

FIGS. 14A and 14B represent additional aspects of the pressure wave characterized in FIG. 13.

FIGS. 19A and 19B depict illustrative locations of wireless terminals 101, 102, 131, and 132 in and around building 602.

DEFINITIONS

Figure 1:
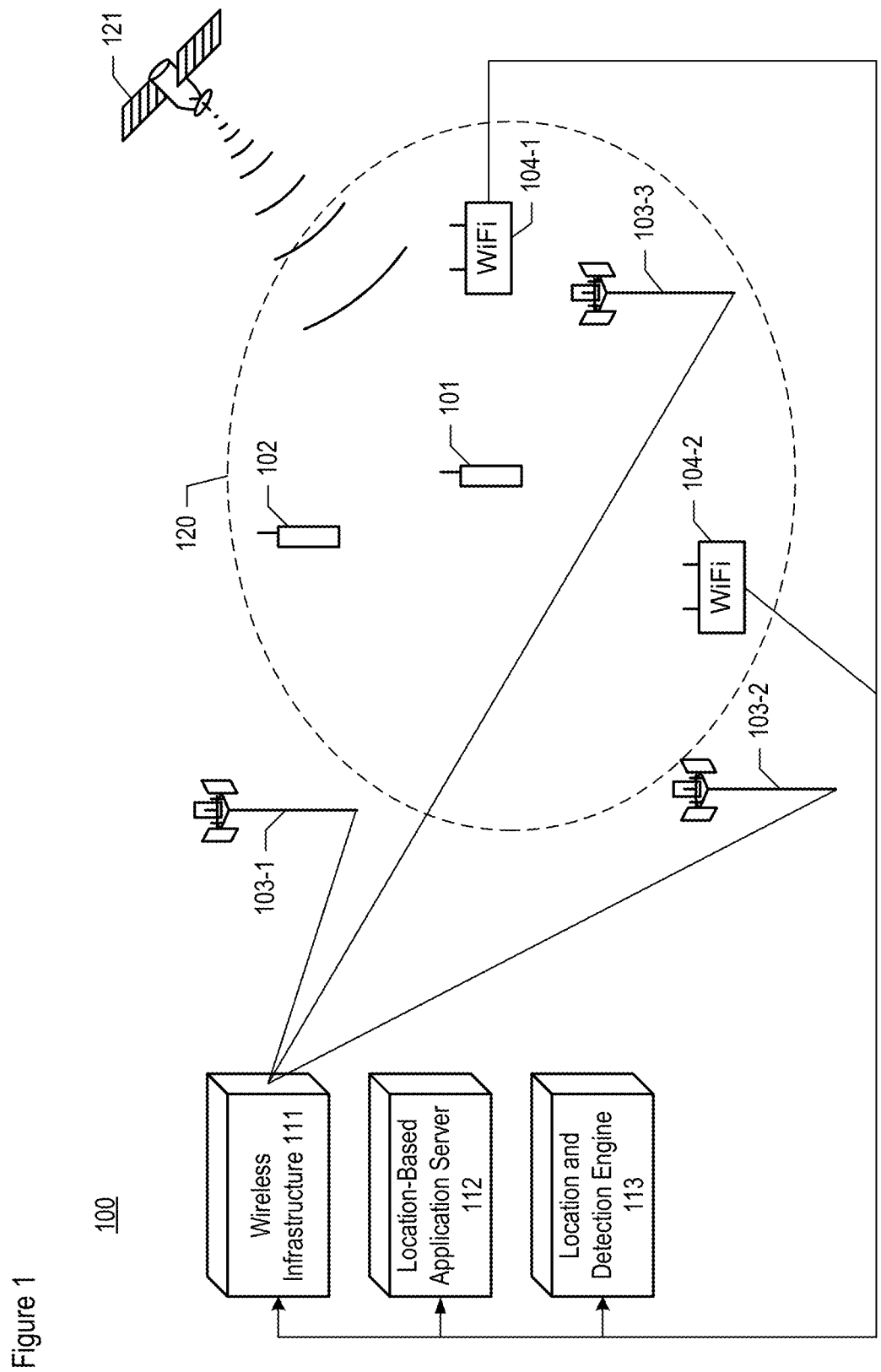
FIG. 1 depicts a diagram of the salient components of wireless telecommunications system 100 in accordance with the illustrative embodiment of the present invention.

Barometric Pressure—For the purposes of this specification, the term "barometric pressure" is defined as a pressure measured by a barometer. This pressure relates to atmospheric pressure, which is the force per unit area exerted on a surface by the weight of the air above that surface in the atmosphere of Earth.

Based on—For the purposes of this specification, the phrase "based on" is defined as "being dependent on" in contrast to "being independent of". The value of Y is dependent on the value of X when the value of Y is different for two or more values of X. The value of Y is independent of the value of X when the value of Y is the same for all values of X. Being "based on" includes both functions and relations.

Door—For the purposes of this specification, the term "door" is defined as a hinged, sliding, or revolving barrier at the entrance to a building, room, or vehicle.

Estimate of the Probability that the Wireless Terminal is Indoors—For the purposes of this specification, an "estimate of the probability that the wireless terminal is indoors" is defined as the complement of an estimate of the probability that the wireless terminal is outdoors (i.e., P(indoors)=1−P (outdoors)).

Generate—For the purposes of this specification, the infinitive "to generate" and its inflected forms (e.g., "generating", "generation", etc.) should be given the ordinary and customary meaning that the terms would have to a person of ordinary skill in the art at the time of the invention.

Identity of a Radio Signal—For the purposes of this specification, the phrase "Identity of a radio signal" is defined as one or more indicia that distinguish one radio signal from another radio signal.

Location—For the purposes of this specification, the term "location" is defined as a zero-dimensional point, a finite one-dimensional path segment, a finite two-dimensional surface area, or a finite three-dimensional volume.

Location-Dependent Trait of a Radio Signal—For the purposes of this specification, the term "location-dependent trait of a radio signal" is defined as a characteristic of a radio signal that varies with:

(i) the location of the transmitter of the signal, or (ii) the location of the receiver of the signal, or (iii) both i and ii.

For example and without limitation, the amplitude and phase of a radio signal are generally location-dependent traits of the signal. In contrast, the frequency of a radio signal is generally not a location-dependent trait of the signal.

Location-Trait Database—For the purposes of this specification, a "Location-Trait Database" is defined as a mapping that associates:

(i) one or more location-dependent traits of one or more radio signals received or transmitted by a wireless terminal, or (ii) the identity of one or more radio signals received or transmitted by a wireless terminal, or (iii) both i and ii, at each of a plurality of locations.

Pressure Wave—For the purposes of this specification, a "pressure wave" is defined as a wave or waves in which the propagated disturbance is a variation of pressure in a material medium (e.g., air, etc.). A pressure wave can comprise one or more alternating compressions and rarefactions, wherein each compression or rarefaction can be the same as, or can be different from, one another with respect to one or more characteristics. Such characteristics can include amplitude, duration, shape, and slope, for example and without limitation.

Processor—For the purposes of this specification, a "processor" is defined as hardware or hardware and software that performs mathematical and/or logical operations.

Radio—For the purposes of this specification, a "radio" is defined as hardware or hardware and software that is capable of telecommunications via an unguided (i.e., wireless) radio signal of frequency less than 600 GHz.

Receive—For the purposes of this specification, the infinitive "to receive" and its inflected forms (e.g., "receiving", "received", etc.) should be given the ordinary and customary meaning that the terms would have to a person of ordinary skill in the art at the time of the invention.

Transient—For the purposes of this specification, a "transient" is defined a momentary variation in a physical property (e.g., barometric pressure, etc.) being measured.

Transmit—For the purposes of this specification, the infinitive "to transmit" and its inflected forms (e.g., "transmitting", "transmitted", etc.) should be given the ordinary and customary meaning that the terms would have to a person of ordinary skill in the art at the time of the invention.

Wireless terminal—For the purposes of this specification, the term "wireless terminal" is defined as a device that is capable of telecommunications without a wire or tangible medium. A wireless terminal can be mobile or immobile. A wireless terminal can transmit or receive or transmit and receive. As is well known to those skilled in the art, a wireless terminal is also commonly called a cell phone, a pager, a wireless transmit/receive unit (WTRU), a user equipment (UE), a mobile station, a fixed or mobile subscriber unit, a pager, a cellular telephone, a personal digital assistant (PDA), a computer, a data packet modem, and any other type of device capable of operating in a wireless environment are examples of wireless terminals.

Detailed Description

FIG. 1 depicts a diagram of the salient components of wireless telecommunications system 100 in accordance with the illustrative embodiment of the present invention. Wireless telecommunications system 100 comprises: wireless terminals 101 and 102, cellular base stations 103-1, 103-2, and 103-3, Wi-Fi base stations 104-1 and 104-2, wireless infrastructure 111, location-based application server 112, location and detection engine 113, and GPS constellation 121, interrelated as shown.

Wireless infrastructure 111, location-based application server 112, location and detection engine 113 (hereinafter "location engine 113"), and Wi-Fi base stations 104-1 and 104-2 are all connected to one or more interconnected computer networks (e.g., the Internet, a local-area network, a wide-area network, etc.) and, as such, can exchange data in well-known fashion.

Although the illustrative embodiment depicts wireless telecommunications system 100 as comprising two wireless terminals, it will be clear to those skilled in the art, after reading this disclosure, how to make and use alternative embodiments of the present invention that comprise any number of wireless terminals.

Wireless terminals 101 and 102 comprise the hardware and software necessary to perform the processes described below and in the accompanying figures. Furthermore, wireless terminals 101 and 102 are mobile and can be at any location within geographic region 120 at any time.

Wireless terminals 101 and 102 can provide bi-directional voice, data, and video telecommunications service to their respective users (not shown), but it will be clear to those skilled in the art, after reading this disclosure, how to make and use embodiments of the present invention in which wireless terminals 101 and 102 provide a different set of services.

In accordance with the illustrative embodiment, wireless terminals 101 and 102 can receive one or more radio signals from each of base stations 103-1, 103-2, and 103-3, Wi-Fi base stations 104-1 and 104-2, and GPS constellation 121, in well-known fashion. Wireless terminals 101 and 102 are also capable of identifying each radio signal it receives, in well-known fashion, and of transmitting the identity of each signal it receives to location engine 113. Wireless terminals 101 and 102 are further capable of measuring one or more location-dependent traits of each radio signal they receive, in well-known fashion, and of transmitting each measurement they generate to location engine 113. And still furthermore, wireless terminals 101 and 102 can measure a difference of a location-dependent trait of two signals they each receive, in well-known fashion, and of transmitting such measurements to location engine 113.

In accordance with the illustrative embodiment, wireless terminals 101 and 102 can transmit one or more radio signals—that can be received by one or more of base stations 103-1, 103-2, and 103-3 and Wi-Fi base stations 104-1 and 104-2—in accordance with specific parameters (e.g., signal strength, frequency, coding, modulation, etc.), in well-known fashion, and of transmitting those parameters to location engine 113.

In accordance with the illustrative embodiment, and as described in detail below, wireless terminals 101 and 102 each comprise a barometer 205 (shown in FIG. 2). Wireless terminals 101 and 102 are capable of measuring (e.g., periodically, sporadically, and on-demand) the barometric pressure, in well-known fashion, and of transmitting the measurements to location engine 113.

Cellular base stations 103-1, 103-2, and 103-3 communicate with wireless infrastructure 111 via wireline and with wireless terminals 101 and 102 via radio in well-known fashion. As is well known to those skilled in the art, base stations are also commonly referred to by a variety of alternative names such as access points, nodes, network interfaces, etc. Although the illustrative embodiment comprises three cellular base stations, it will be clear to those skilled in the art, after reading this disclosure, how to make and use alternative embodiments of the present invention that comprise any number of cellular base stations.

In accordance with the illustrative embodiment of the present invention, cellular base stations 103-1, 103-2, and 103-3 are terrestrial and immobile, and base station 103-3 is situated within geographic region 120. It will be clear to those skilled in the art, after reading this disclosure, how to make and use alternative embodiments of the present invention in which some or all of the base stations are airborne, marine-based, or space-based, regardless of whether or not they are moving relative to the Earth's surface, and regardless of whether or not they are within geographic region 120.

Cellular base stations 103-1, 103-2, and 103-3 comprise the hardware and software necessary to be 3GPP-compliant and to perform the processes described below and in the accompanying figures. For example and without limitation, each of cellular base stations 103-1, 103-2, and 103-3 are capable of continually:

a. receiving one or more radio signals transmitted by wireless terminals 101 and 102, and
b. identifying each radio signal transmitted by wireless terminals 101 and 102, in well-known fashion, and of transmitting the identity of those signals to location engine 113, and
c. measuring one or more location-dependent traits of each radio signal transmitted by wireless terminals 101 and 102, in well-known fashion, and of transmitting the measurements to location engine 113, and
d. transmitting one or more signals to wireless terminals 101 and 102 in accordance with specific parameters (e.g., signal strength, frequency, coding, modulation, etc.), in well-known fashion, and of transmitting those parameters to location engine 113, and
e. broadcasting one or more signals that wireless terminals can use for various purposes (e.g., mobile assisted handoff, location determination, etc.).

It will be clear to those skilled in the art how to make and use cellular base stations 103-1, 103-2, and 103-3.

Wi-Fi base stations 104-1 and 104-2 communicate with wireless terminals 101 and 102 via radio in well-known fashion. Wi-Fi base stations 104-1 and 104-2 are terrestrial, immobile, and within geographic region 120. Although the illustrative embodiment comprises two Wi-Fi base stations, it will be clear to those skilled in the art, after reading this disclosure, how to make and use alternative embodiments of the present invention that comprise any number of Wi-Fi base stations.

Each of Wi-Fi base stations 104-1 and 104-2 are capable of continually:

a. receiving one or more radio signals transmitted by wireless terminals 101 and 102, and
b. identifying each radio signal transmitted by wireless terminals 101 and 102, in well-known fashion, and of transmitting the identity of those signals to location engine 113, and
c. measuring one or more location-dependent traits of each radio signal transmitted by wireless terminals 101 and 102, in well-known fashion, and of transmitting the measurements to location engine 113, and
f. transmitting one or more signals to wireless terminals 101 and 102 in accordance with specific parameters (e.g., signal strength, frequency, coding, modulation, etc.), in well-known fashion, and of transmitting those parameters to location engine 113, and d. broadcasting one or more signals that wireless terminals can use for various purposes (e.g., mobile assisted handoff, location determination, etc.).

It will be clear to those skilled in the art how to make and use Wi-Fi base stations 104-1 and 104-2.

Wireless infrastructure 111 comprises a switch that orchestrates the provisioning of telecommunications service to wireless terminals 101 and 102 and the flow of information to and from location engine 113, as described below and in the accompanying figures. As is well known to those skilled in the art, wireless switches are also commonly referred to by other names such as mobile switching centers, mobile telephone switching offices, routers, and so on.

Location-based application server 112 comprises hardware and software that uses the estimate of the location of wireless terminals 101 and 102—generated by location engine 113—in a location-based application, in well-known fashion. Location-based applications are well-known in the art and provide services such as without limitation E-911 routing, navigation, location-based advertising, weather alerts.

Figure 3:
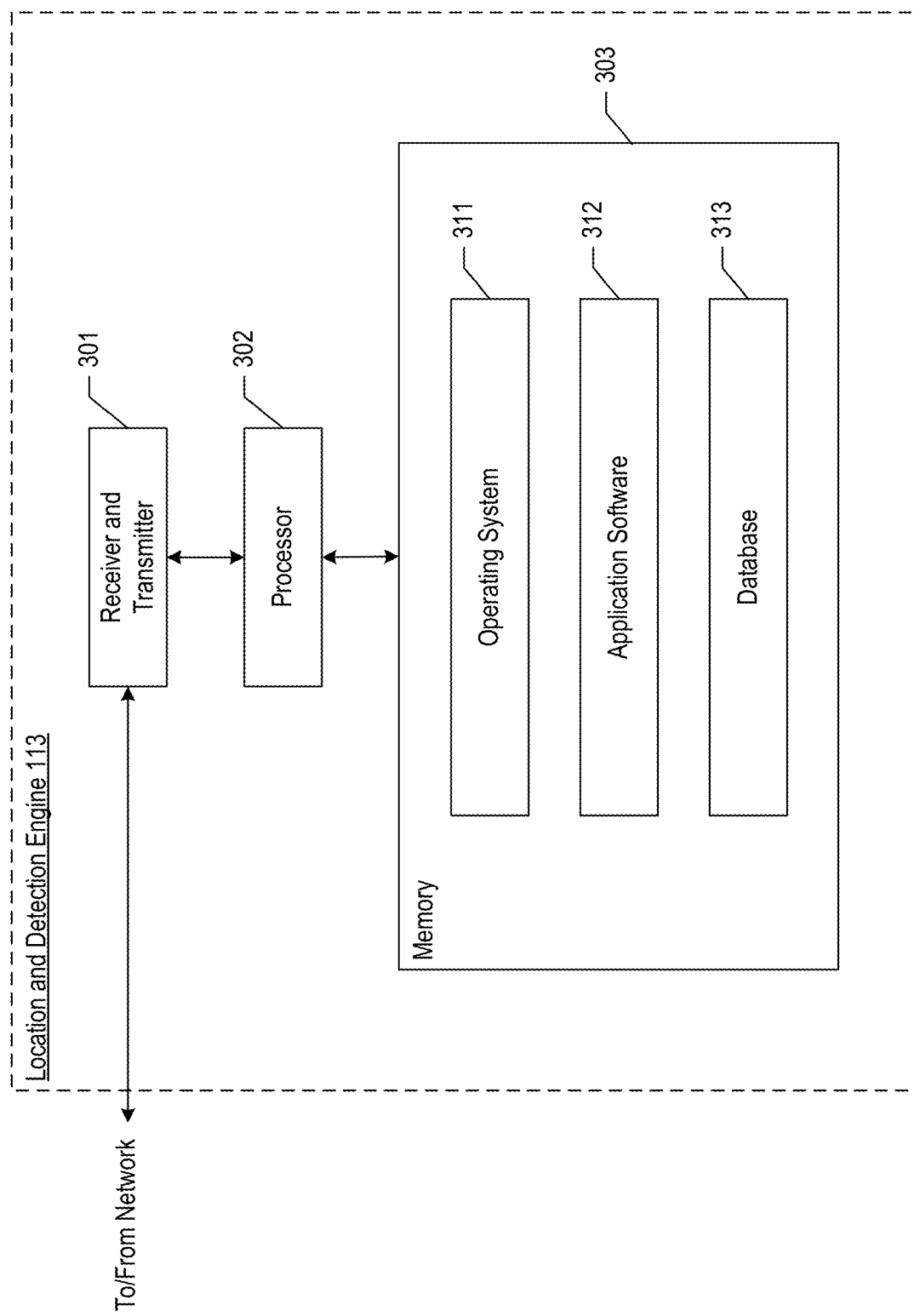
FIG. 3 depicts a block diagram of the salient components of location and detection engine 113 in accordance with the illustrative embodiment.

Location engine 113 is a data processing system that comprises hardware and software that generates one or more estimates of the locations of wireless terminals 101 and 102 as described below and in the accompanying figures. It will be clear to those skilled in the art, after reading this disclosure, how to make and use location engine 113. Furthermore, although location engine 113 is depicted in FIG. 3 as physically distinct from wireless infrastructure 111, it will be clear to those skilled in the art, after reading this disclosure, how to make and use alternative embodiments of the present invention in which location engine 113 is wholly or partially integrated into wireless infrastructure 111. Location engine 113 comprises the location-trait database and GIS databases, which are described in detail below.

Figure 2:
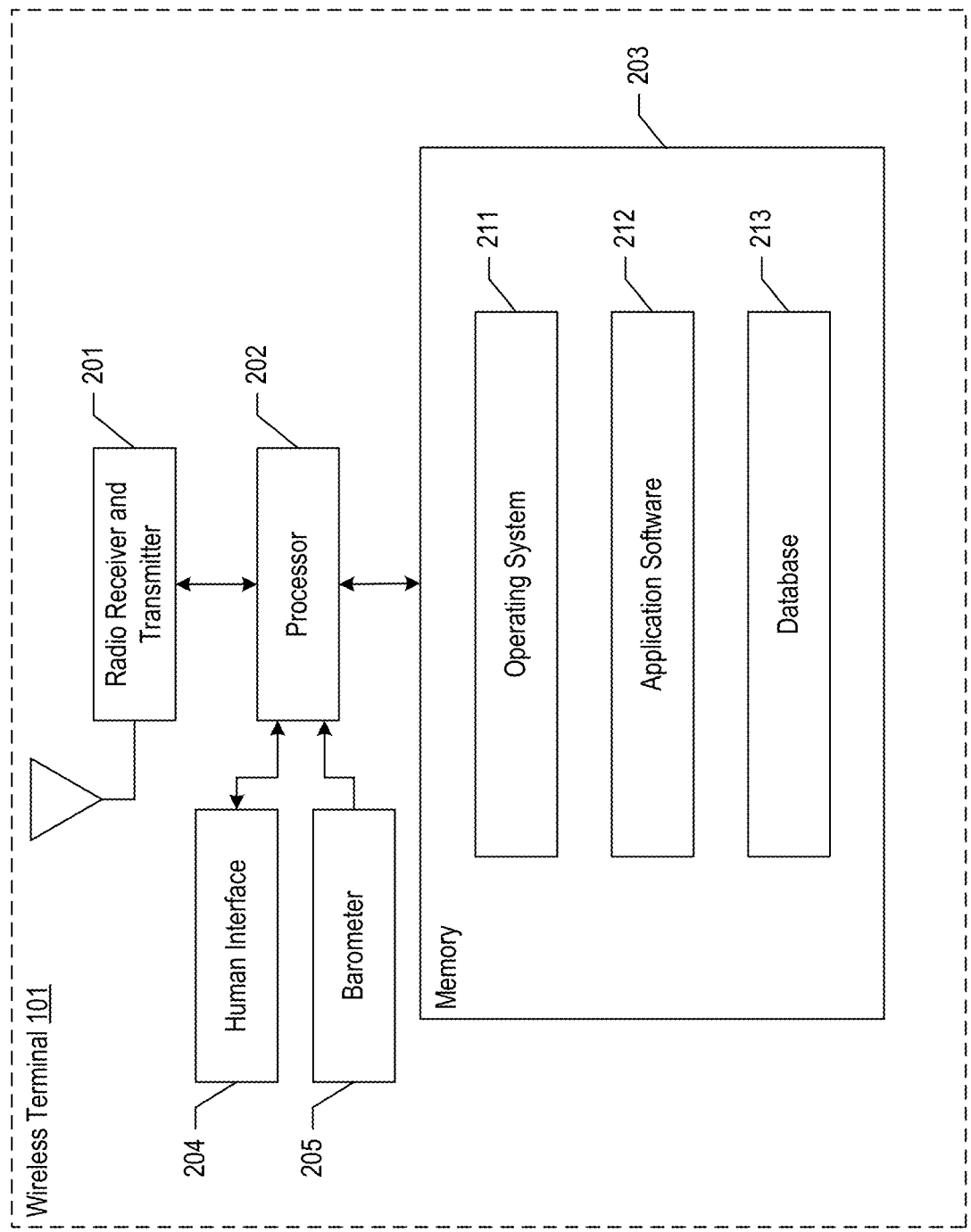
FIG. 2 depicts a block diagram of the salient components of wireless terminal 101 in accordance with the illustrative embodiment of the present invention.

Wireless Terminal 101—FIG. 2 depicts a block diagram of the salient components of wireless terminal 101 in accordance with the illustrative embodiment of the present invention. Wireless terminal 101 comprises: radio receiver and transmitter 201, processor 202, memory 203, human interface 204, and barometer 205, interconnected as shown. The block diagram depicted in FIG. 2 can also be considered representative of wireless terminal 102 and other wireless terminals.

Radio receiver and transmitter 201 comprises hardware and software that enables wireless terminal 101 to receive (and analyze) radio signals and to transmit radio signals. In accordance with the illustrative embodiment, wireless telecommunications service is provided to wireless terminal 101 in accordance with the Long-Term Evolution (LTE) 4G air-interface standard of the 3$^{rd}$ Generation Partnership Project ("3GPP"). After reading this disclosure, however, it will be clear to those skilled in the art how to make and use alternative embodiments of the present invention that operate in accordance with one or more other air-interface standards (e.g., a 5G or other standard under development, a different 4G standard, Global System Mobile "GSM," UMTS, CDMA-2000, IS-136 TDMA, IS-95 CDMA, 3G Wideband CDMA, IEEE 802.11 Wi-Fi, 802.16 WiMax, Bluetooth, etc.) in one or more frequency bands. It will be clear to those skilled in the art how to make and use radio receiver and transmitter 201.

Processor 202 is hardware under the command of software stored in memory 203 that performs all of the functions described below and in the accompanying figures. It will be clear to those skilled in the art how to make and use processor 202.

Memory 203 is a non-transitory, non-volatile random-access memory that holds all of the programming and data required for the operation of wireless terminal 101, and includes operating system 211, application software 212, and database 213. It will be clear to those skilled in the art how to make and use memory 203.

Human interface 204 is hardware and software that enables a person to interact with wireless terminal 101. Human interface 204 comprises a display, keypad, microphone, and speaker. It will be clear to those skilled in the art how to make and use human interface 204.

Barometer 205 is a hardware MEMS sensor that measures the atmospheric pressure at wireless terminal 101, thereby providing barometric pressure measurements. In accordance with the illustrative embodiment, barometer 205 comprises the LSP331AP MEMS pressure sensor from ST Microelectronics and/or the Bosch BMP280 sensor, but it will be clear those skilled in the art, after reading this disclosure, how to make and use alternative embodiments of the present invention that use a different sensor to measure the atmospheric pressure.

As those who are skilled in the art will appreciate, wireless terminal 101 can be equipped with one or more sensors that can measure temperature of and/or humidity in the environment. For example, the Bosch BMP280 chip is also capable of measuring temperature.

Wireless terminal 101 can perform at least some of the processes described below and in the accompanying figures. For example and without limitation, wireless terminal 101 is capable of:

a. receiving one or more radio signals transmitted by cellular base stations 103-1, 103-2, and 103-3, Wi-Fi base stations 104-1 and 104-2, and GPS constellation 121, and b. identifying each radio signal transmitted by cellular base stations 103-1, 103-2, and 103-3, Wi-Fi base stations 104-1 and 104-2, and GPS constellation 121, in well-known fashion, and of transmitting the identity of those signals to location engine 113, and c. measuring one or more location-dependent traits of each radio signal transmitted by cellular base stations 103-1, 103-2, and 103-3, Wi-Fi base stations 104-1 and 104-2, and GPS constellation 121, in well-known fashion, and of transmitting the measurements to location engine 113, and d. transmitting one or more signals to cellular base stations 103-1, 103-2, and 103-3, Wi-Fi base stations 104-1 and 104-2 in accordance with specific parameters (e.g., signal strength, frequency, coding, modulation, etc.), in well-known fashion, and of transmitting those parameters to location engine 113, and e. measuring the barometric pressure at wireless terminal 101, in well-known fashion, and transmitting those measurements to location engine 113. In some embodiments of the present invention, wireless terminal can measure the temperature and/or humidity at wireless terminal 101, in well-known fashion, and transmit those measurements to location engine 113.

It will be clear to those skilled in the art how to make and use wireless terminal 101.

Location Engine 113—FIG. 3 depicts a block diagram of the salient components of location engine 113 in accordance with the illustrative embodiment. Location engine 113 comprises: receiver and transmitter 301, processor 302, and memory 303, which are interconnected as shown.

Receiver and transmitter 301 enables location engine 113 to transmit to and receive from wireless terminals 101 and 102, wireless infrastructure 111, location-based application server 112, and Wi-Fi base stations 104-1 and 104-2, in well-known fashion. It will be clear to those skilled in the art how to make and use receiver and transmitter 303.

Processor 302 is a general-purpose processor that can execute an operating system, the application software that performs tasks 403 through 417 (described herein and shown in FIG. 4), and of populating, amending, using, and managing a location-trait database and a GIS database, as described in detail below and in the accompanying figures. It will be clear to those skilled in the art how to make and use processor 302.

In general, the location-trait database contains information for the possible locations of wireless terminal and the identity and location-dependent traits of radio signals as if wireless terminal 101 were at each of those locations. It will be clear to those skilled in the art how to make and use the location-trait database.

In general, the GIS database contains information for geographic region 120, including without limitation, the physical characteristics of all of the structures in geographic region 120. It will be clear to those skilled in the art how to make and use the GIS database.

Memory 303 is a non-transitory, non-volatile memory that stores:
 a. operating system 311, and
 b. application software 312, and
 c. the location-trait database in database 313, and
 d. the GIS database in database 313.

It will be clear to those skilled in the art how to make and use memory 303.

Figure 4:
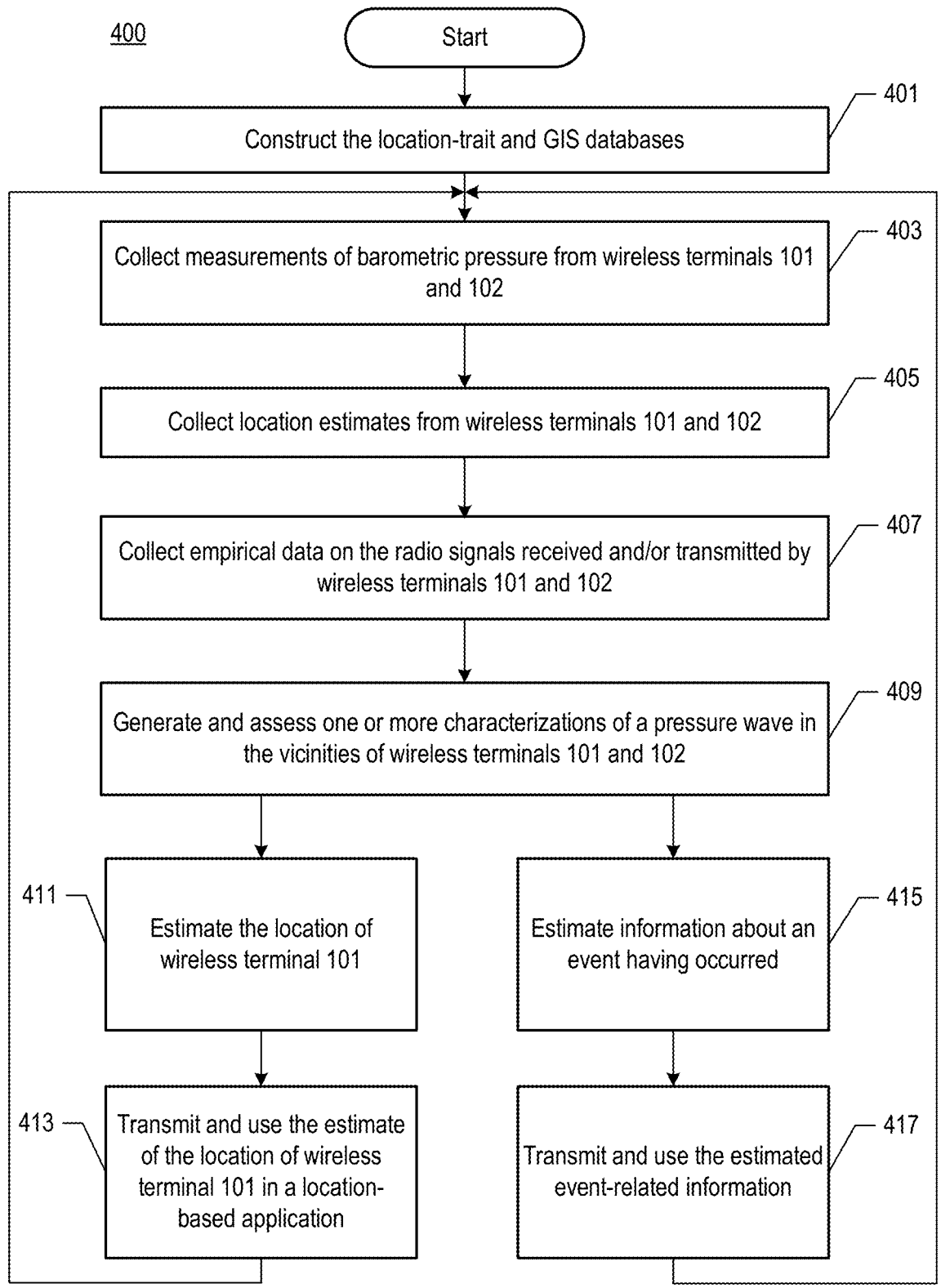
FIG. 4 depicts a flowchart of the salient processes performed in accordance with the illustrative embodiment of the present invention.

Operation of the Illustrative Embodiment—FIG. 4 depicts a flowchart of the salient processes performed in accordance with the illustrative embodiment of the present invention. It will be clear to those having ordinary skill in the art, after reading the present disclosure, how to make and use alternative embodiments of method 400, as well as the other methods disclosed in this specification, wherein the recited operations sub-operations, and messages are differently sequenced, grouped, or sub-divided—all within the scope of the present disclosure. It will also be clear to those skilled in the art, after reading the present disclosure, how to make and use alternative embodiments of the disclosed methods wherein some of the described operations, sub-operations, and messages are optional, or are omitted.

It will also be clear to those skilled in the art, after reading the present disclosure, how to make and use alternative embodiments of the disclosed methods wherein some of the disclosed operations are performed by other elements and/or systems. For example and without limitation, at least some of the operations disclosed as being performed by location engine 113 can be performed by one or more wireless terminals (e.g., terminal 101, terminal 102, etc.).

At task 401, the location-trait database and the GIS database are constructed and stored in memory 303 of location engine 113. Task 401 is described in detail below and in the accompanying figures.

At task 403, location engine 113 collects measurements of barometric pressure from wireless terminals 101 and 102. In some embodiments of the present invention, location engine 113 can also collect measurements of temperature and/or humidity from wireless terminals 101 and 102. Task 403 is described in detail below and in the accompanying figures.

At task 405, location engine 113 collects location estimates from wireless terminals 101 and 102. Task 405 is described in detail below and in the accompanying figures.

At task 407, location engine 113 collects empirical data on the radio signals received and transmitted by wireless terminals 101 and 102. Task 407 is described in detail below and in the accompanying figures.

At task 409, location engine 113 generates characterizations of a pressure wave that is in the vicinities of wireless terminals 101 and 102, based on the barometric pressure measurements, and assesses the characterizations. Task 409 is described in detail below and in the accompanying figures.

At task 411, location engine 113 estimates the location of wireless terminal 101, based in part on the characterizations of the pressure wave. Task 411 is described in detail below and in the accompanying figures.

At task 413, location engine 113 transmits the estimate of the location of wireless terminal 101 generated in task 411 to location-based application server 112 and/or to wireless terminal 101 for use in a location-based application. It will be clear to those skilled in the art how to enable embodiments of the present invention to perform task 413. After task 413 is completed, control passes back to task 403.

At task 415, location engine 113 estimates information about an event having occurred, based in part on the characterizations of the pressure wave. Task 415 is described in detail below and in the accompanying figures. Location 113 can perform tasks 415 and 417, either instead of or in addition to tasks 411 and 413.

At task 417, location engine 113 transmits the estimate of the event-related information generated in task 415 to location-based application server 112 and/or to wireless terminal 101 or 102 for use. In some embodiments of the present invention, the event-related information is displayed (e.g., by wireless terminal 101, etc.). It will be clear to those skilled in the art how to enable embodiments of the present invention to perform task 417. After task 417 is completed, control passes back to task 403.

Figure 5:
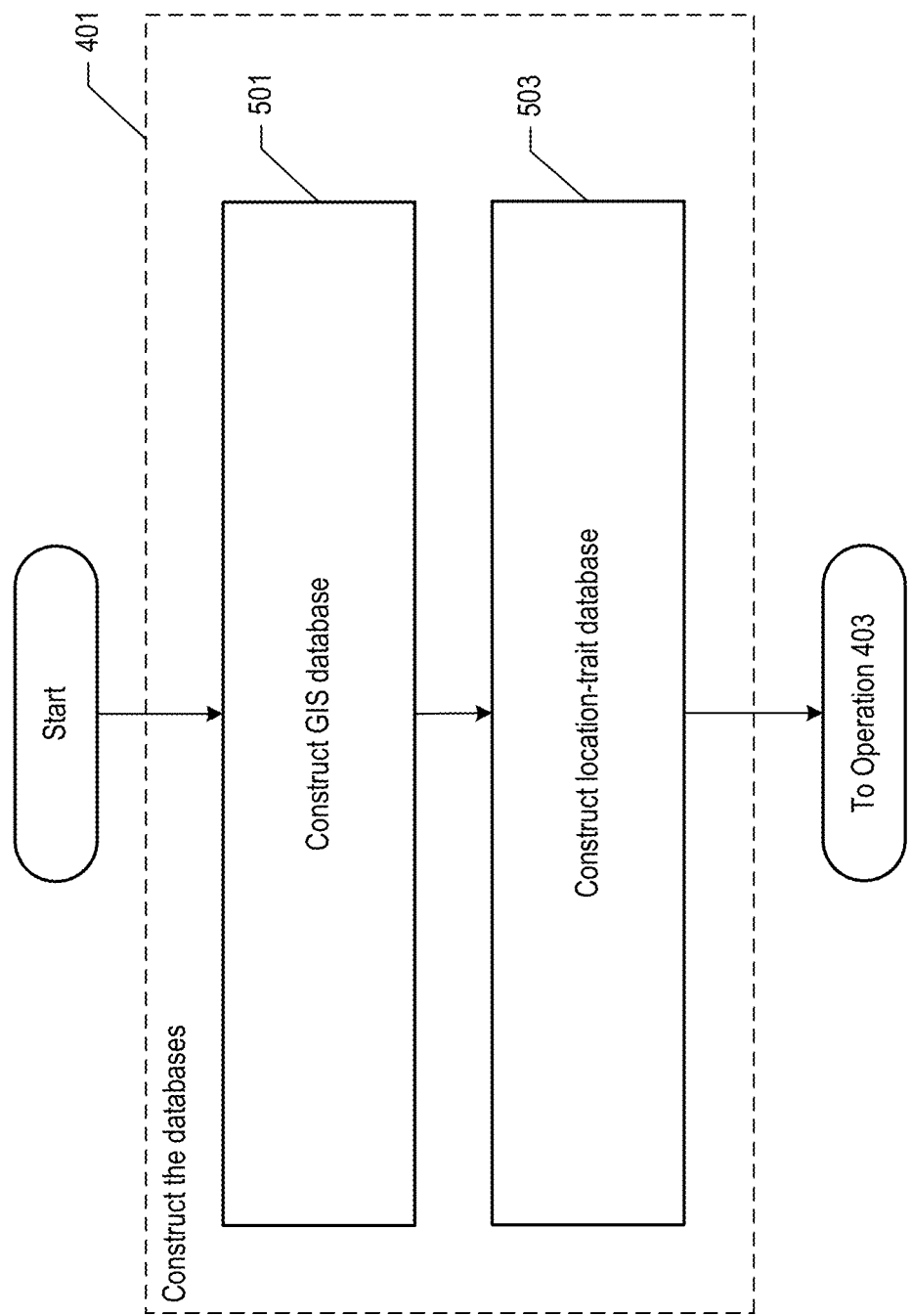
FIG. 5 depicts a flowchart of the salient processes performed in accordance with task 401.

Task 401: Construct the GIS Database and the Location-Trait Database—FIG. 5 depicts a flowchart of the salient processes performed in accordance with task 401.

At task 501, the GIS database is constructed and stored in memory 303 of location engine 113.

Figure 6:
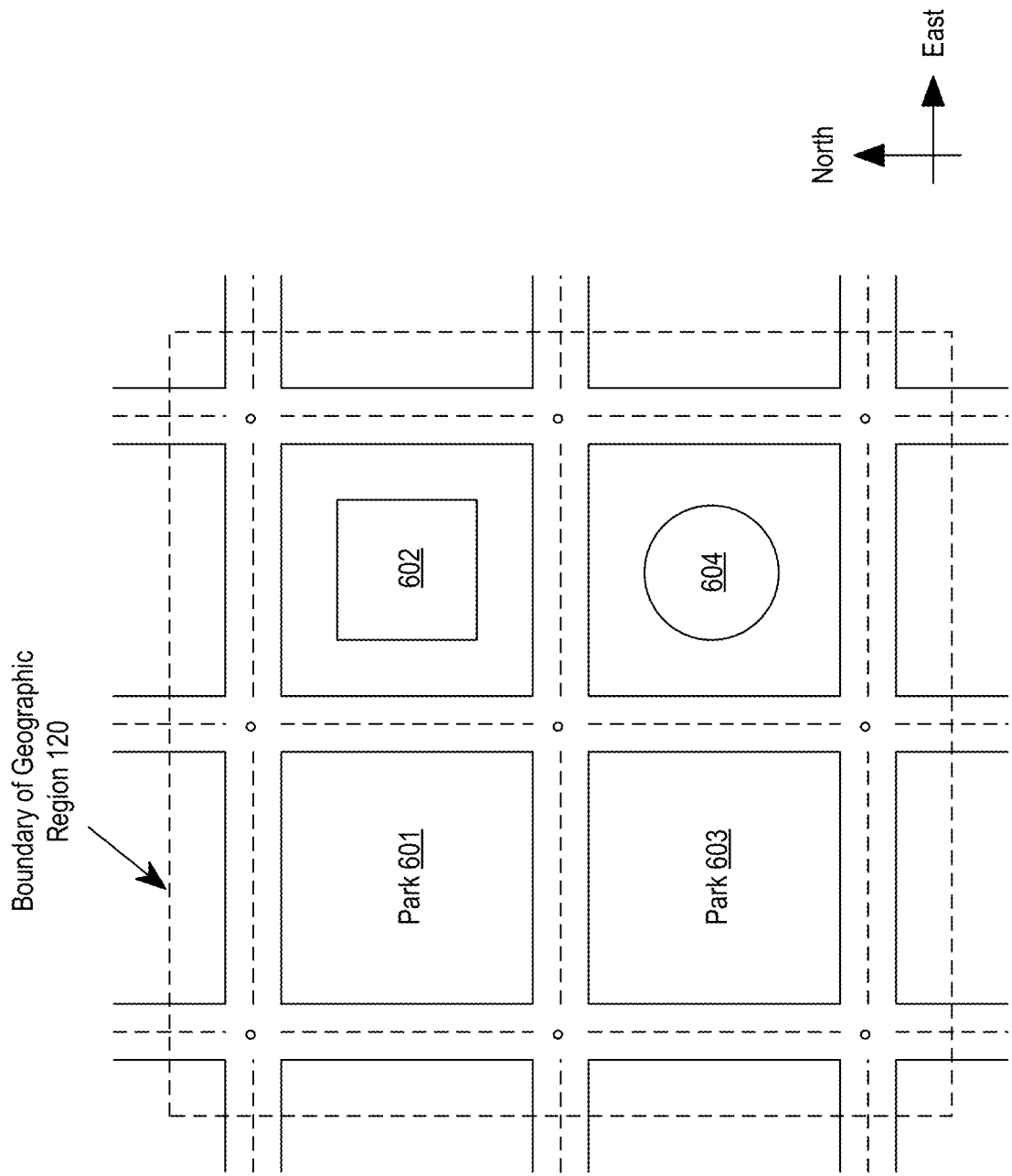
FIG. 6 a detailed map of the ground level of geographic region 120.

As part of task 501, geographic region 120 is delimited and surveyed. FIG. 6 depicts a detailed map that is made of geographic region 120, which spans approximately four city blocks and comprises, among other things, park 601, square building 602, empty lot 603, and circular building 604. It will be clear to those skilled in the art, after reading this disclosure, how to make and use alternative embodiments of the present invention that comprise any area, any geographic features, and any number, size, height, and shape of structures.

In accordance with the illustrative embodiment, geographic region 120 is flat, level, and at a known elevation. It will be clear to those skilled in the art, however, after reading this disclosure, how to make and use alternative embodiments of the present invention in which geographic region is not flat, not level, and/or is at a different elevation.

In accordance with the illustrative embodiment, geographic region 120 is square and comprises approximately four city blocks of an urban environment. It will be clear to those skilled in the art however, after reading this disclosure, how to make and use alternative embodiments of the present invention in which geographic region 120 has any area of any shape and any population density and development.

Figure 7:
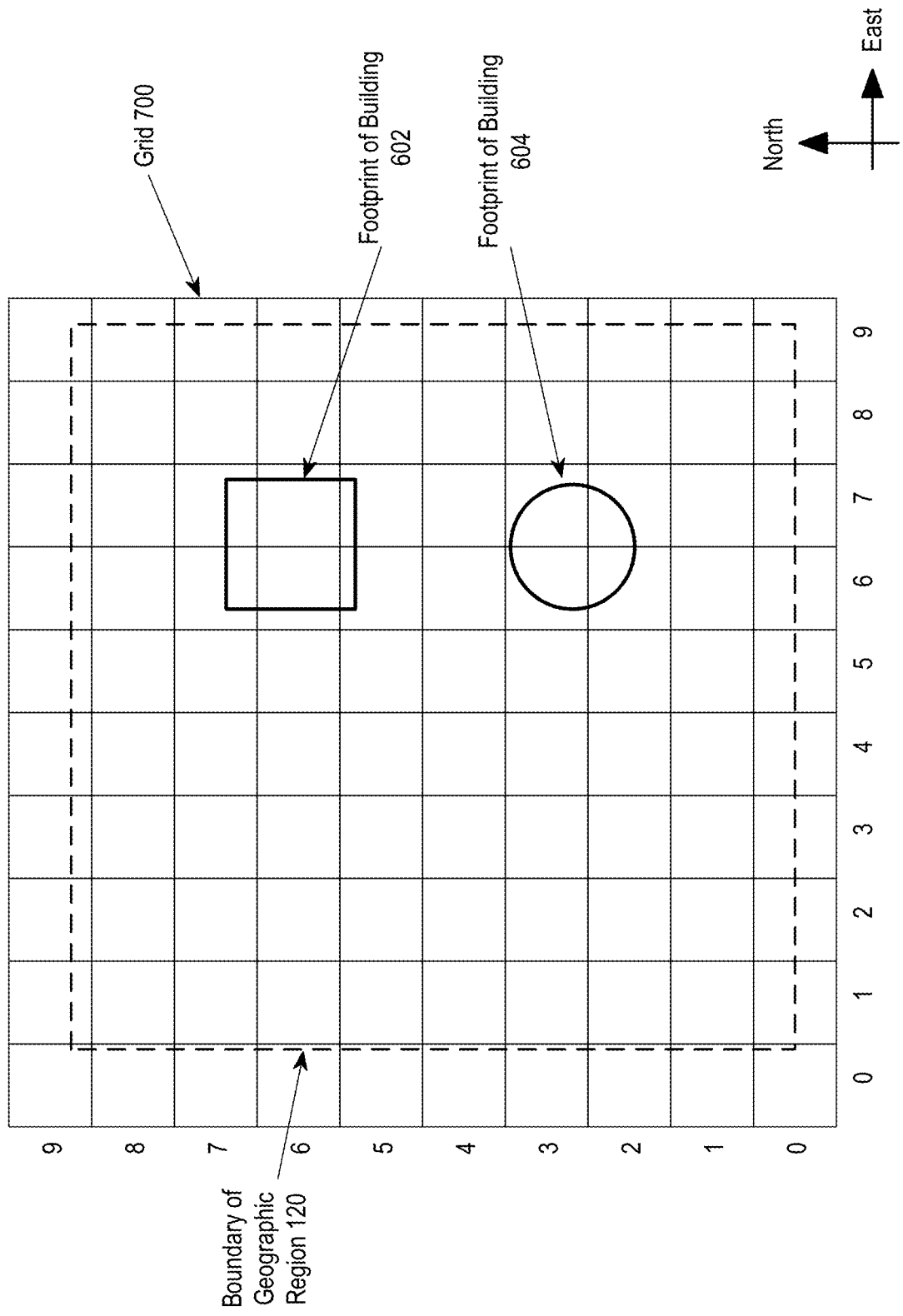
FIG. 7 depicts geographic region 120 divided into a 10 by 10 grid.

As part of task 501, grid 700 is overlaid onto geographic region 120 as shown in FIG. 7. Grid 700 is a 10-by-10-meter grid that partitions geographic region 120 into a plurality of possible locations of wireless terminal 101. FIG. 7 also depicts the relationship of the footprints of square building 602 and circular building 604 with respect to the grid.

Although the illustrative embodiment comprises 100 grid squares, it will be clear to those skilled in the art how to make and use alternative embodiments of the present invention that comprise any number of possible locations with any shape. See for example and without limitation, U.S. Pat. No. 7,753,278, which is incorporated by reference.

Also as part of task 501, the indoor space within each building within geographic region 120 is delimited and surveyed. FIGS. 8A and 8B depict respective maps of the ground floor (map 602-1) and cross sections of the multiple floors (map 602-2) of square building 602. In particular, elevator 801, stairwell 802, and building entry doors 803 and 804 are depicted, which are known to be sources of pressure waves within the building. As those who are skilled in the art will appreciate after reading this specification, other sources of pressure waves (e.g., HVAC equipment and infrastructure, windows, manufacturing equipment, closed spaces, equipment for releasing building over-pressurization, etc.) aside from or in addition to doors and elevators can be delimited and surveyed.

It will be clear to those skilled in the art, after reading this disclosure, how to make and use alternative embodiments of the present invention that comprise any indoor floor area, any indoor features (e.g., location of building assets, structural fixtures, etc.), and any number, size, height, and shape of building features (e.g., moms, doors, building floors, etc.).

Also depicted in FIGS. 8A and 8B are illustrative locations of wireless terminals 101, 102, and 131 in and around building 602. Although not part of the survey itself, the wireless terminals are depicted in order to show that they can be outside of the building, within the building, and at different places within the building. As disclosed below, the pressure waves experienced by these different wireless terminals can be different from one another; consequently, the techniques disclosed herein can use a characterization of the pressure wave in the vicinities of these wireless terminals to estimate various types of information, both about a wireless terminal and about a source of an event that causes a pressure wave.

At task 503, the location-trait database is constructed and stored into memory 303 of location engine 113. As part of task 503, the identity—and location-dependent traits for—each radio signal a wireless terminal (e.g., terminal 101, terminal 102, etc.) is expected to be able to receive from cellular base stations 103-1, 103-2, and 103-3, Wi-Fi base stations 104-1 and 104-2, for each possible location of the wireless terminal, is determined in well-known fashion.

As part of task 503, the identity of—and location-dependent traits for—each radio signal that each of cellular base stations 103-1, 103-2, and 103-3, Wi-Fi base stations 104-1 and 104-2 is expected to be able to receive from wireless terminal 101, for each possible location of wireless terminal 101, is determined in well-known fashion.

It will be clear to those skilled in the art how to accomplish task 503, and in accordance with the illustrative embodiment, this can be accomplished through a combination of empirical data gathering (e.g., "drive-testing"), crowd-sourcing, and/or radio-frequency propagation modeling. See for example and without limitation, U.S. Patent Application Publications 2008/0077356, 2008/0077472, and 2008/0077516, which are incorporated by reference.

Figure 9:
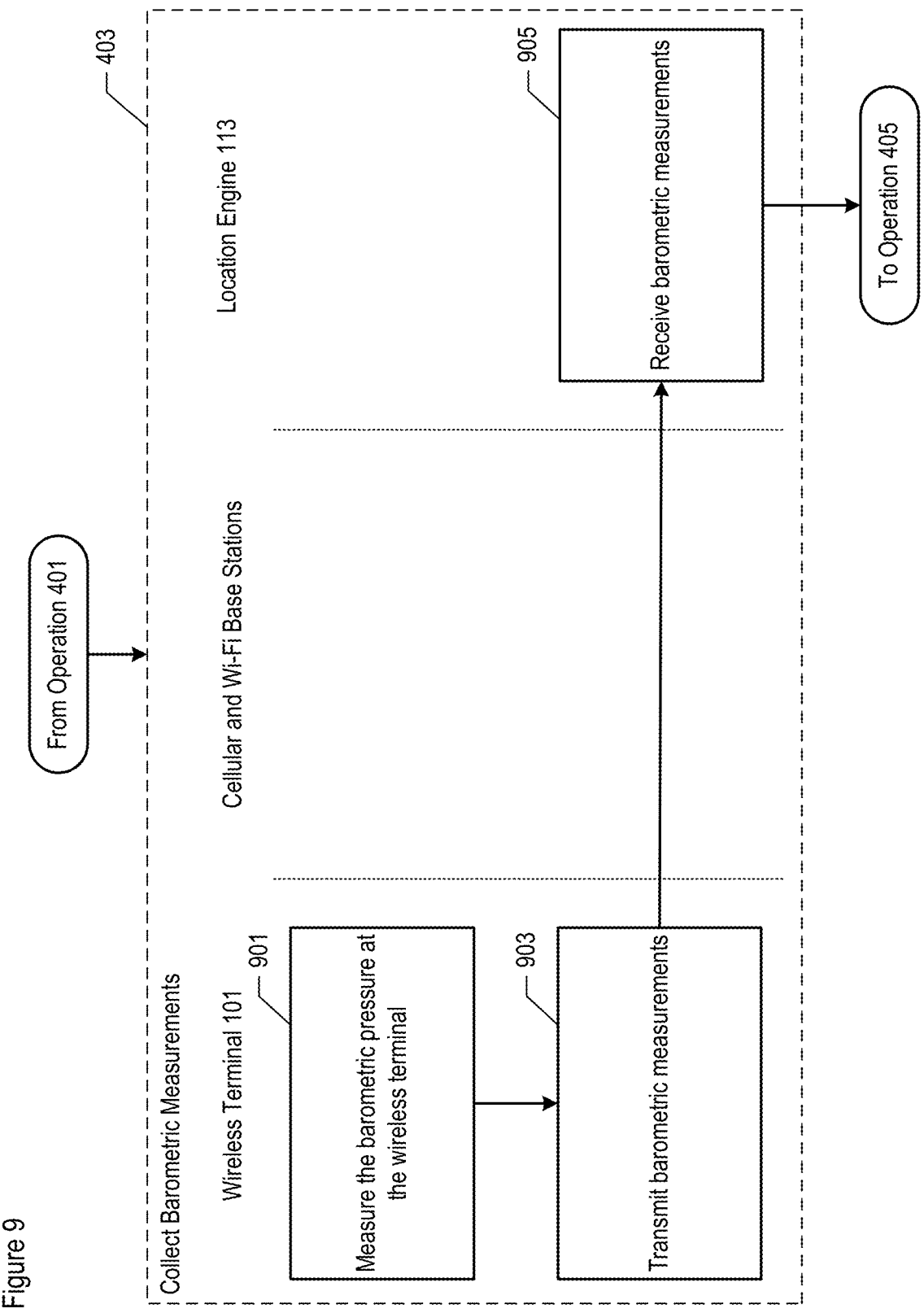
FIG. 9 depicts a flowchart of the salient processes performed in accordance with task 403.

Task 403: Collect Barometric Measurements—FIG. 9 depicts a flowchart of the salient processes performed in accordance with task 403. For illustrative purposes, wireless terminal 101 is depicted as performing various operations in FIG. 9 and other figures. It will be clear to those skilled in the art after reading this specification, however, how to make and use embodiments of the present invention in which other wireless terminals (e.g., wireless terminal 102, etc.) perform at least some of the operations that wireless terminal 101 is depicted as performing, in addition to or instead of wireless terminal 101.

At task 901, wireless terminal 101 measures samples of barometric pressure, $P_T$, in its vicinity by using barometer 205. In some embodiments of the present invention, each sample represents one measurement of barometric pressure, while in some other embodiments each sample comprises more than one measurement of barometric pressure. In accordance with the illustrative embodiment, a measurement of barometric pressure is taken once per second, but it will be clear to those skilled in the art how to make and use alternative embodiments of the present invention that take the measurements at a different rate (e.g., 5 per second, 10 per second, etc.).

At task 903, wireless terminal 101 transmits the samples of barometric pressure, $P_T$, to location engine 113. In accordance with the illustrative embodiment, task 903 is performed every 5 seconds, but it will be clear to those skilled in the art how to make and use alternative embodiments of the present invention that transmit the samples of barometric pressure at other times.

At task 905, location engine 113 receives the barometric pressure samples transmitted in task 903.

In accordance with the illustrative embodiment, tasks 901, 903, and 905 are performed continuously, concurrently, and asynchronously. It will be clear to those skilled in the art how to make and use alternative embodiments of the present invention, in which a non-wireless device measures samples and provides them to location engine 113, and in which location engine 113 receives barometric pressure samples from at least some non-wireless devices.

As those who are skilled in the art will appreciate after reading this specification, in some embodiments of the present invention wireless terminal 101 can perform at least some of the analysis on the barometric measurements, such as that performed in accordance with task 409. Thus, task 903 is not necessarily needed for terminal 101 to analyze a pressure wave or to refine the pressure wave over time. Additionally, information helpful to wireless terminal 101, such as changes in exterior pressure, can also be sent and stored on the wireless terminal.

Figure 10:
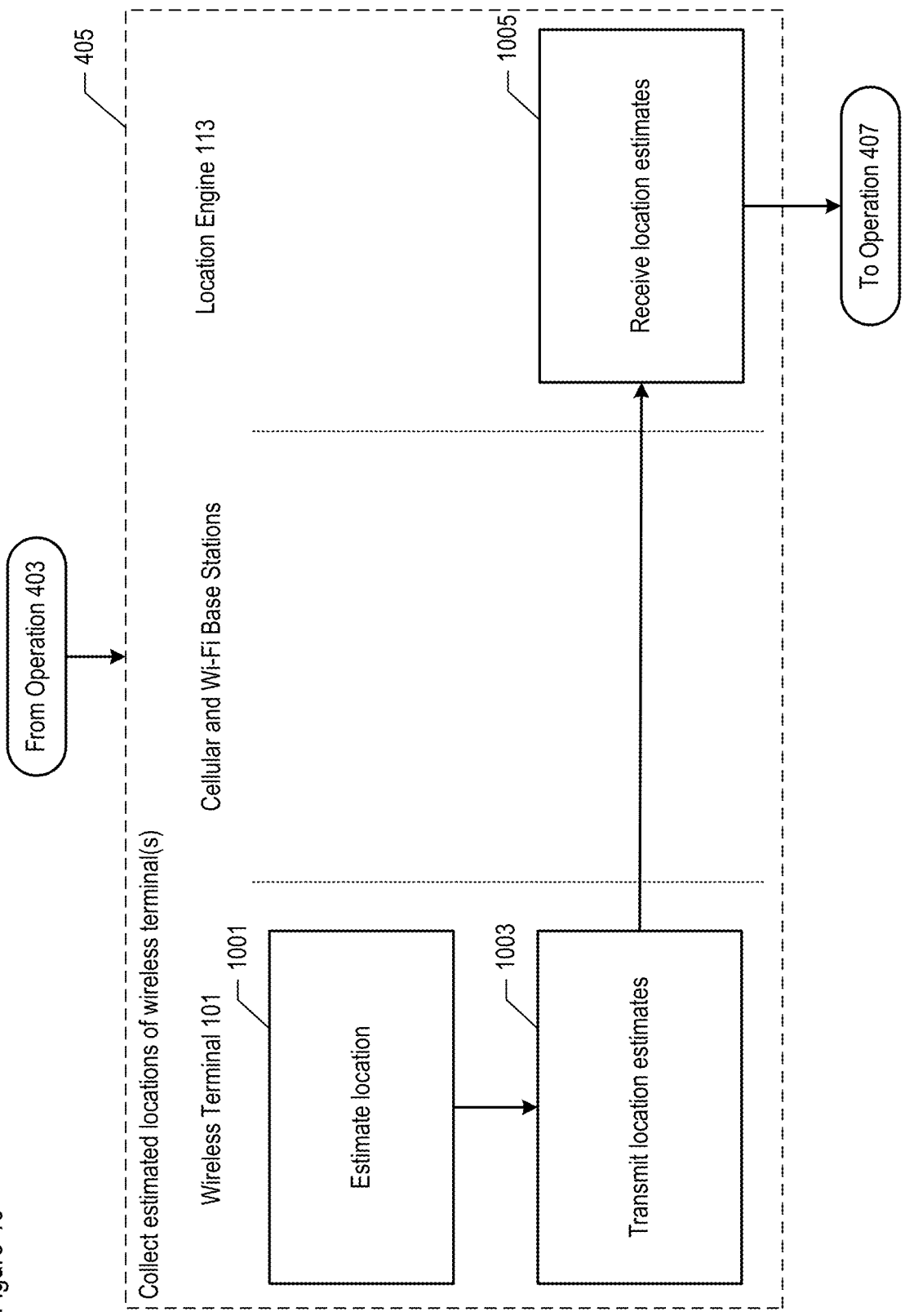
FIG. 10 depicts a flowchart of the salient processes performed in accordance with task 405.

Task 405: Collect Estimated Locations of Wireless Terminal—FIG. 10 depicts a flowchart of the salient processes performed in accordance with task 405.

At task 1001, wireless terminal 101 estimates its location in well-known fashion. In accordance with the illustrative embodiment, task 1001 is performed once every 10 seconds, but it will be clear to those skilled in the art how to make and use alternative embodiments of the present invention that take the measurements at a different rate (e.g., every second, etc.).

At task 1003, wireless terminal 101 transmits its location estimates, $L_T$, to location engine 113. In accordance with the illustrative embodiment, task 1003 is performed every 10 seconds, but it will be clear to those skilled in the art how to make and use alternative embodiments of the present invention that transmit the measurements at other times.

At task 1005, location engine 113 receives the location estimates transmitted in task 1003.

In accordance with the illustrative embodiment, tasks 1001, 1003, and 1005 are performed continuously, concurrently, and asynchronously.

Figure 11:
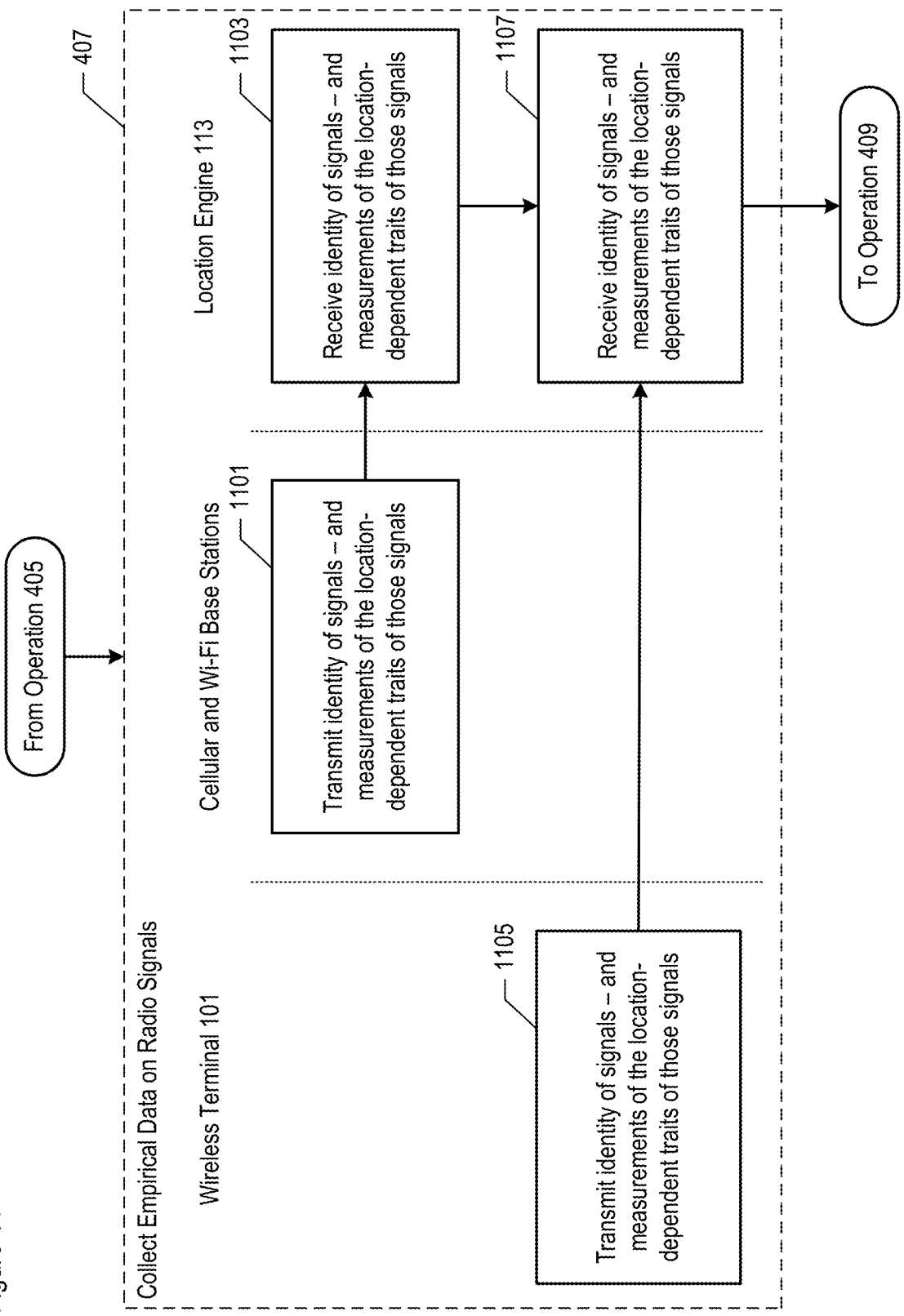
FIG. 11 depicts a flowchart of the salient processes performed in accordance with task 407.

Task 407: Collect Empirical Data on Radio Signals—FIG. 11 depicts a flowchart of the salient processes performed in accordance with task 407.

At task 1101, each of cellular base stations 103-1, 103-2, and 103-3 and Wi-Fi base stations 104-1 and 104-2 transmits the identity of each signal it has received from wireless terminal 101 and the measurements (i.e., as measured by the base station) of the location-dependent traits of those signals. In accordance with the illustrative embodiment, task 1101 is performed every 20 milliseconds, but it will be clear to those skilled in the art how to make and use alternative embodiments of the present invention that transmit the measurements at other times.

At task 1103, location engine 113 receives the identities and measurements transmitted at task 1101.

At task 1105, wireless terminal 101 transmits the identity of each signal it receives from cellular base stations 103-1, 103-2, and 103-3 and Wi-Fi base stations 104-1 and 104-2, and the measurements (i.e., as measured by the wireless terminal) of the location-dependent traits of those signals. In accordance with the illustrative embodiment, task 1105 is performed every 20 milliseconds, but it will be clear to those skilled in the art how to make and use alternative embodiments of the present invention that transmit the measurements at other times.

At task 1107, location engine receives the identities and measurements transmitted at task 1105.

In accordance with the illustrative embodiment, tasks 1101, 1103, 1105, and 1107 are performed continuously, concurrently, and asynchronously.

Figure 12:
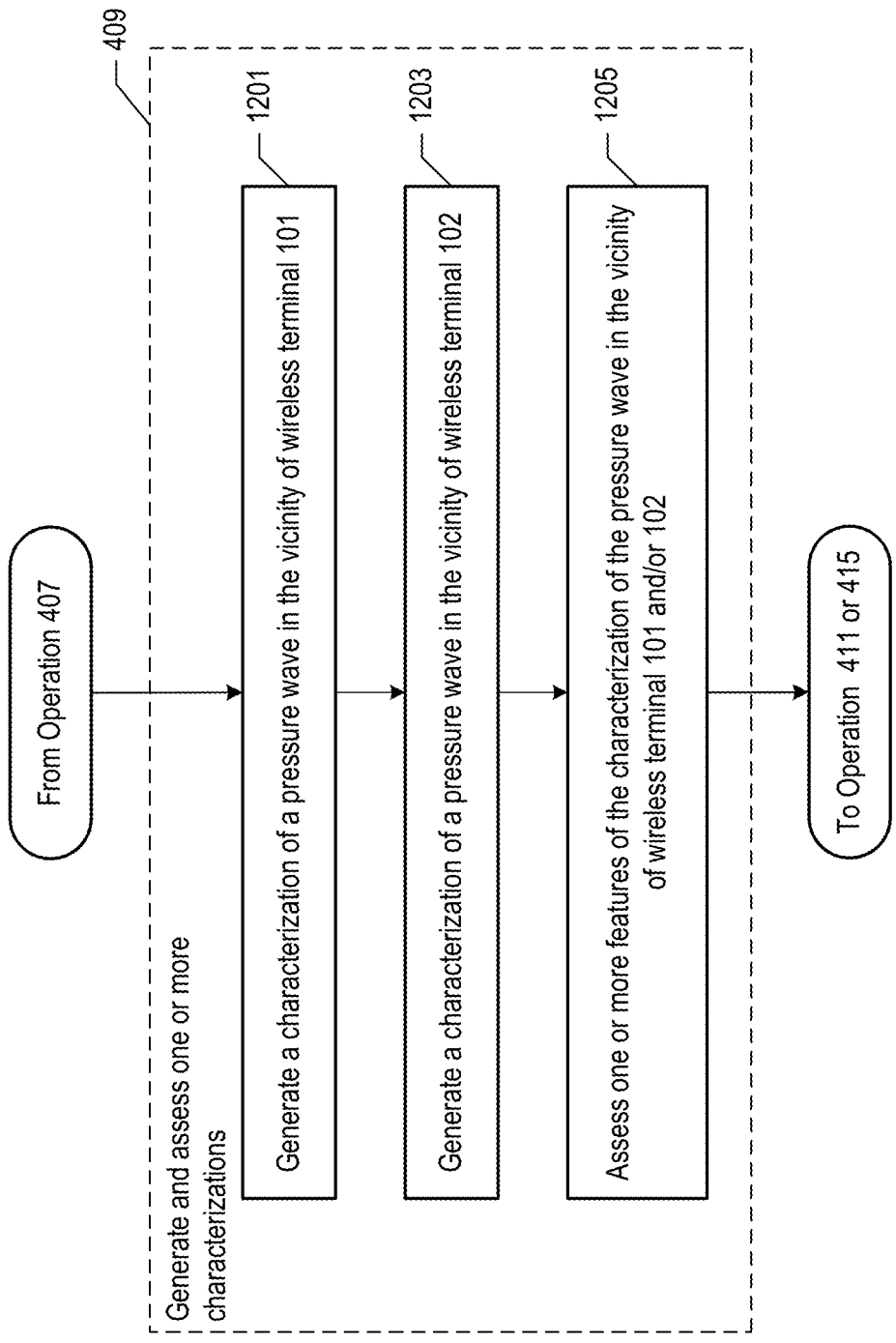
FIG. 12 depicts a flowchart of the salient processes performed in accordance with task 409.

Task 409: Generate One or More Characterizations of a Pressure Wave—FIG. 12 depicts a flowchart of the salient processes performed in accordance with task 409.

At task 1201, location engine 113 generates a first characterization of a pressure wave in the vicinity of wireless terminal 101, based on one or more samples of barometric pressure measured at wireless terminal 101 and received at task 905. In accordance with the illustrative embodiment, the first characterization characterizes the pressure in the air in the vicinity of wireless terminal 101, as a function of time. In some alternative embodiments of the present invention, a characterization of a pressure wave can be generated from measurements originating from a different type of sensor, such as a microphone that is capable of detecting frequencies below 30 Hz, some of which being associated with a pressure wave moving through the air.

Figure 13:
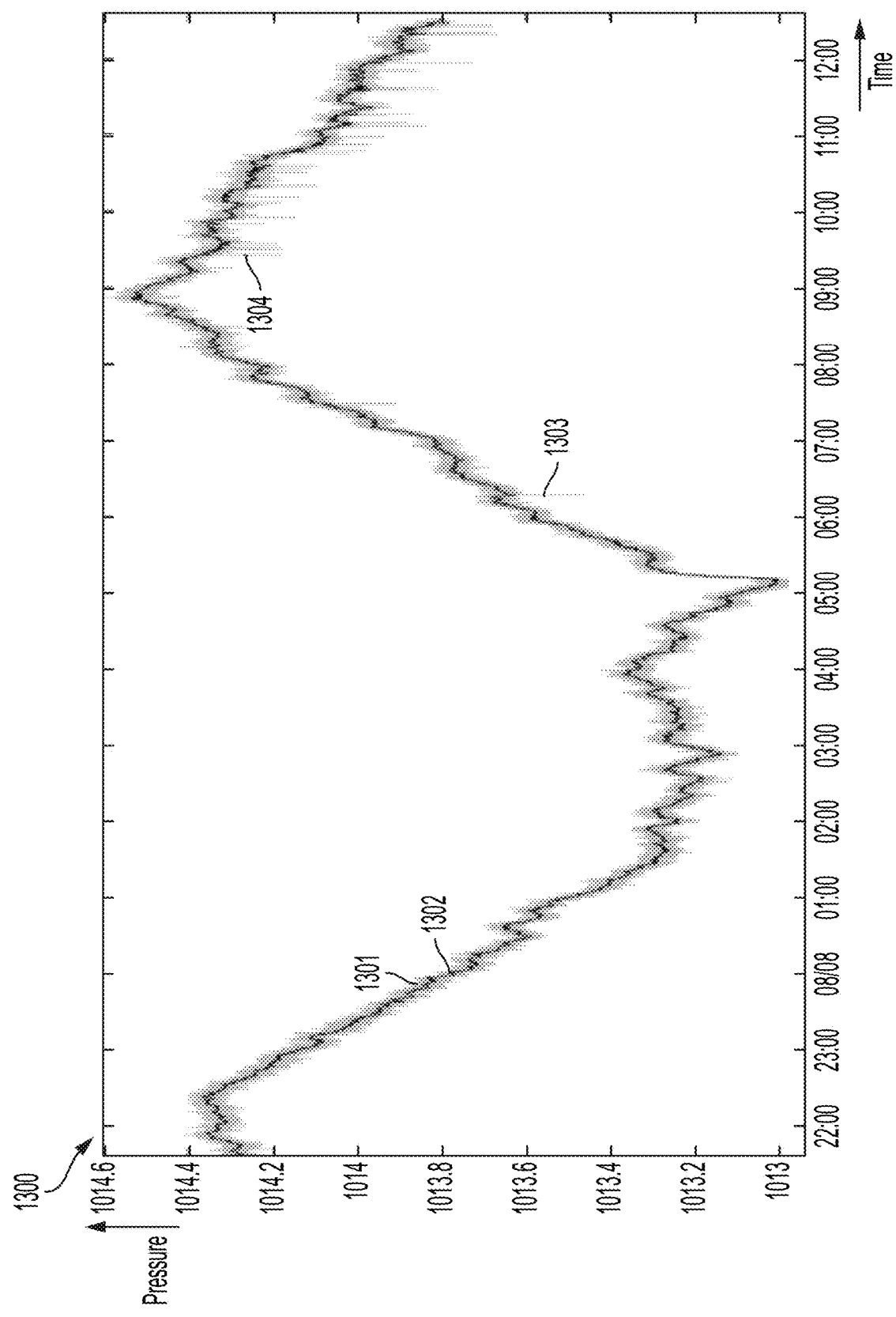
FIG. 13 depicts characterization 1300, which represents barometric pressure in the vicinity of wireless terminal 101, as a function of time.

As an example, FIG. 13 depicts characterization 1300, which represents barometric pressure (in millibars) in the vicinity of wireless terminal 101, as a function of time (over 14 hours). Graph 1301 represents the raw pressure data over time (one measurement taken per second), while graph 1302 represents a processed version of the raw pressure data, smoothed by using the median value within a sliding window (40 seconds in length). Transients 1303 and 1304 are transients in the raw data, and are two of many that appear in the characterization (mainly between time 09:00 am and 12:30 pm).

Figure 14A:
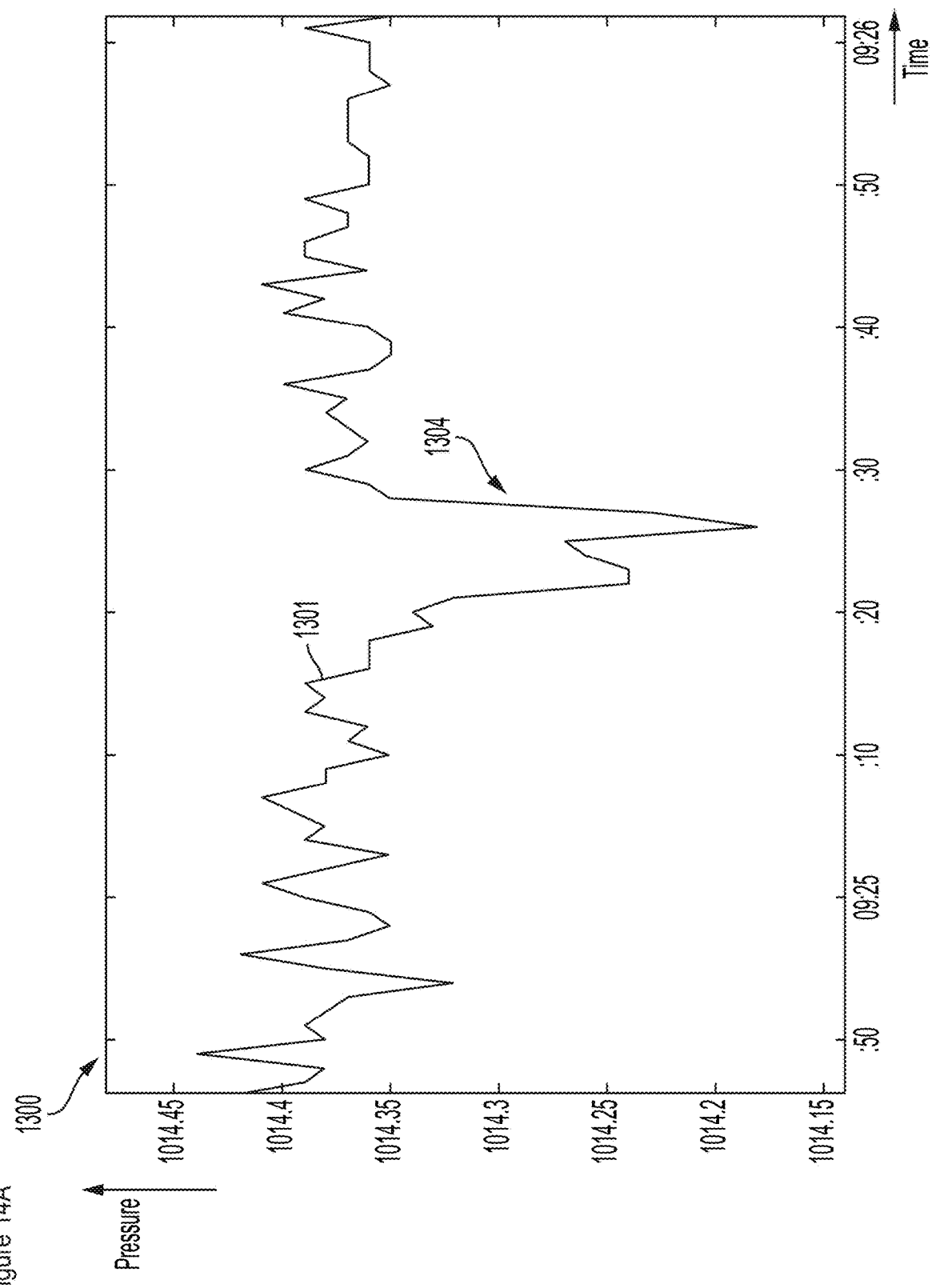

FIGS. 14A and 14B represent additional aspects of the pressure wave characterized in FIG. 13. FIG. 14A depicts a zoomed-in portion of characterization 1300 and also represents barometric pressure (in millibars) in the vicinity of wireless terminal 101 as a function of time, but over roughly 70 seconds or so. Graph 1301 represents the raw pressure data over time (one measurement taken per second), as in FIG. 13. Transient 1304 is depicted in FIG. 14A and, for pressure values that fall to below 1014.35 millibars, has a duration of around six seconds.

As those who are skilled in the art will appreciate after reading this specification, a transient can be characterized as lasting for a predetermined length of time (e.g., one second or more, two seconds or more, five seconds or more, one second or less, two seconds or less, five seconds or less, etc.) below (or above) a predetermined level. In some embodiments of the present invention, location engine 113 can infer a speed of propagation of the pressure wave from the change in pressure as characterized by the transient; for example, a wider transient might signify a slower-moving pressure wave, while a narrower transient might signify a faster-moving pressure wave.

A transient can also be characterized as exceeding a predetermined deviation in pressure from a reference level, as depicted in FIG. 14B. FIG. 14B depicts characterization 1400, which is based on the same raw pressure data as characterization 1300, and over the same period of time. Characterization 1400 is different in that it represents the absolute value of the difference between graph 1301 and graph 1302. Threshold 1401 is a threshold for median barometric sensor noise. Transients 1303 and 1304 are the same transients in the data as before. By representing the absolute value of the difference as described above, characterization 1400 emphasizes the characteristic of the peak amplitude (i.e., a non-negative value) of a transient exceeding, by a predetermined amount, at least one of i) a mean value of and ii) median value of a portion of the pressure wave. Characterization 1400 is also affected by the sliding-window size and/or other noise reduction methods that can be used to generate graph 1302.

At task 1203, location engine 113 generates a second characterization of a pressure wave in the vicinity of wireless terminal 102, based on one or more samples of barometric pressure measured at wireless terminal 102. In accordance with the illustrative embodiment, the second characterization characterizes the pressure in the air in the vicinity of wireless terminal 102, as a function of time.

At task 1205, location engine 113 assesses one or more features of each characterization of the pressure wave in the vicinities of one or more wireless terminals. As described above and in regard to FIGS. 12, 13, 14A, and 14B, a characterization of a pressure wave can have one or more transients present, wherein each transient has one or more predetermined characteristics. A first feature determined to be present in the characterization, for example and without limitation, is that the peak amplitude (i.e., a non-negative value) of a transient exceeds, by a predetermined amount, a median value or a mean value of a portion of the pressure wave being characterized (as described in FIG. 14B). A second feature is that the duration of a transient exceeds a predetermined value (as described in FIG. 14A).

A third feature is that the transient, or the pressure wave in general, matches a predetermined pattern. For example, a pressure wave might be very "spiky" when a wireless terminal is next to a door of an elevator being operated or might exhibit a different slope or change in slope, compared to when the wireless terminal is far away from the elevator door or is experiencing a pressure wave from a different source (e.g., a building entry door, etc.). In other words, location engine 113 can distinguish each source of a pressure wave from one another by the signature of the event caused by the source and where the wireless terminal currently is in relation to the source.

Location engine 113 also determines the time at which each transient in the pressure wave is experienced by each wireless terminal, in order to use the information for time-dependent calculations (e.g., trilateration, etc.).

As those who are skilled in the art will appreciate after reading this specification, location engine 113 is able to take advantage of a first pressure wave, at least in some circumstances, having a unique signature. The signature is unique in that it distinguishes the first pressure wave (e.g., caused by a first event, originating at a first source, etc.) from a second pressure wave that might be present and/or propagating at the same time as the first. For example, in at least some of the operations described below, location engine 113 can choose to process multiple characterizations of a first pressure wave, but not those of a second pressure wave, or it can choose to process multiple characterizations of a second pressure wave, but not those of a first pressure wave, or it can choose to process both sets of characterizations.

Figure 15:
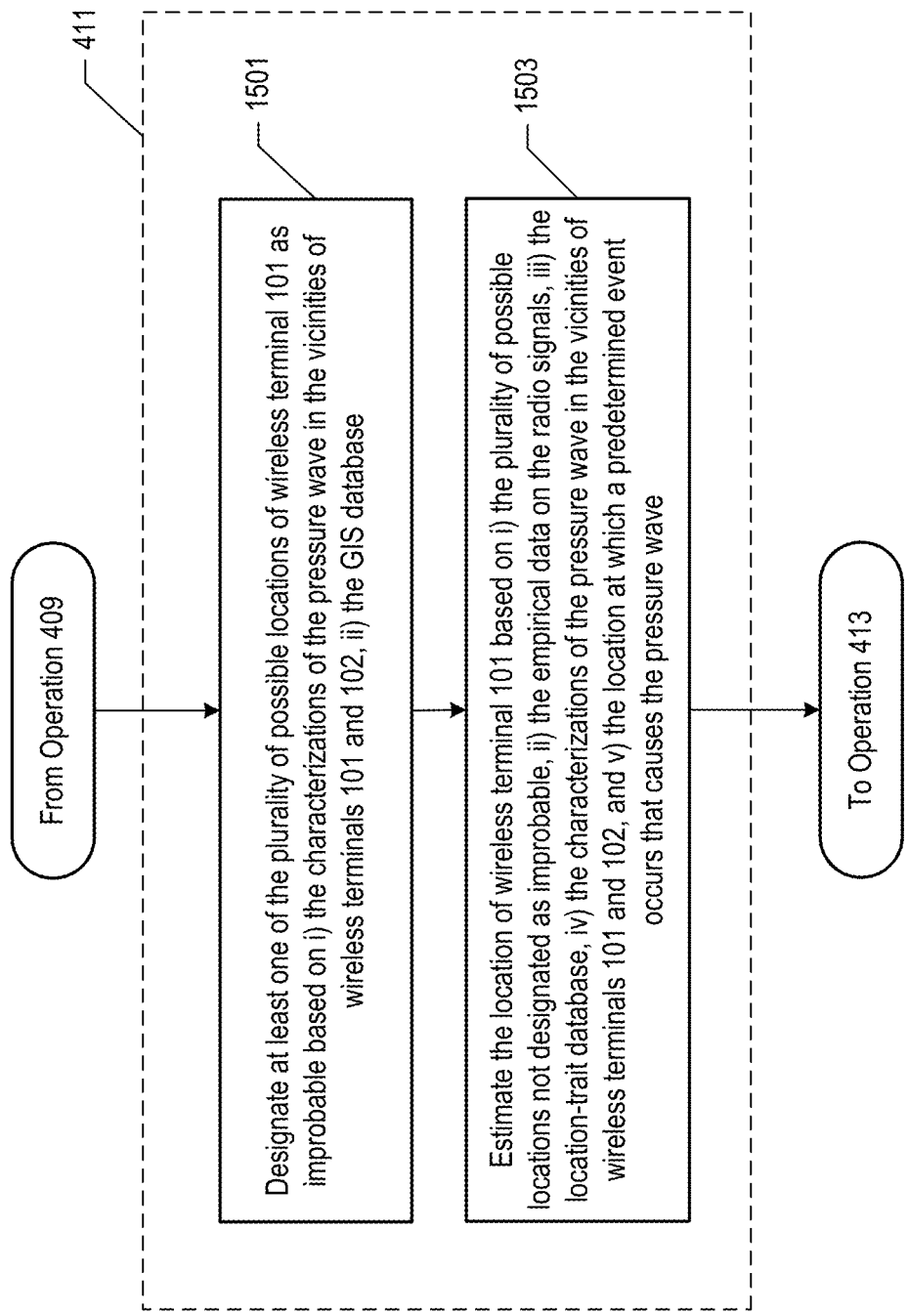
FIG. 15 depicts a flowchart of the salient processes performed in accordance with task 411.

Task 411: Estimate the Location of Wireless Terminal 101—FIG. 15 depicts a flowchart of the salient processes performed in accordance with task 411.

At task 1501, location engine 113 designates at least one of a plurality of possible locations of wireless terminal 101 as improbable based on one or more of:
 (i) the characterizations of the pressure wave in the vicinities of one or more wireless terminals, including wireless terminals 101 and 102, and
 (ii) the information in the GIS database.
Task 1501 is described in detail below and in the accompanying figures.

At task 1503, location engine 113 generates an estimate of the location of wireless terminal 101 based on one or more of:
 (i) the plurality of possible locations not designated as improbable in task 1501,
 (ii) the empirical data on radio signals received in task 407,
 (iii) the information in the location-trait database,
 (iv) the characterizations of the pressure wave in the vicinities of one or more wireless terminals (e.g., terminal 101, terminal 102, etc.), and
 (v) the location at which a predetermined event occurs that causes the pressure wave.

It will be clear to those skilled in the art how to enable embodiments of the present invention to perform task 1503 in regard to items (i) through (iii) in the list above. See for example and without limitation, U.S. Pat. Nos. 6,944,465, 7,460,505, 7,383,051, 7,257,414, 7,753,278, 7,433,695, 7,848,762, and 8,630,665, each of which are incorporated by reference.

In some embodiments of the present invention, location engine 113 estimates a location as being whether wireless terminal 101 is indoors or outdoors. For example, as described and regarding task 1601, location engine 113 might estimate (e.g., determine a probability, etc.) that wireless terminal is indoors based on the characterization of the pressure wave in the vicinity of wireless terminal 101.

Location engine 113, in some embodiments of the present invention, can base the estimate of the location of wireless terminal 101 on one or more features of each characterization of the pressure wave in the vicinities of one or more wireless terminals. As described above and in regard to task 409 and FIGS. 12, 13, 14A, and 14B, a characterization of a pressure wave can have one or more transients present, wherein each transient has one or more predetermined characteristics. A first feature determined to be present in the characterization, for example and without limitation, is that the peak amplitude (i.e., a non-negative value) of a transient exceeds, by a predetermined amount, a median value or a mean value of a portion of the pressure wave being characterized (as described in FIG. 14B). As another example, a second feature is that the duration of a transient exceeds a predetermined value (as described in FIG. 14A). As yet another example, a third feature is that the transient matches a predetermined pattern.

Location engine 113, in some embodiments of the present invention, can base the estimate of the location of wireless terminal 101 on the location at which a predetermined event occurs that causes the pressure wave. For example and without limitation, a particular door to a building is known to have been opened or closed at a particular time (e.g., as determined from a security log, etc.) and a transient appears in the pressure wave of wireless terminal 101 a particular time later. In this example, location engine 113 can estimate the distance from the door at a known location in the building to wireless terminal 101's location, provided that the speed of propagation of the pressure wave is known. The speed of the wave can be determined ahead of time (e.g., empirically, via modelling, etc.). The speed can be affected by air density, air temperature, and/or water saturation (humidity), as those who are skilled in the art will appreciate. In the same example, transients appearing in pressure waves in the vicinities of additional wireless terminals can be used to further refine the estimate of the location of wireless terminal 101. The presence of a transient, or other features, in each characterization of the pressure wave in the vicinities of one or more wireless terminals, can be ascertained as described above.

As those who are skilled in the art will appreciate after reading this specification, location engine 113 can also base the outcome of task 1501 and/or task 1503 at least in part on temperature and/or humidity measurements received from one or more wireless terminals. For example, location engine 113 can retrieve the local outdoor temperature for an area and adjust the probability of a wireless terminal being in a building (or vehicle) if the temperature measured by the wireless terminal and the outdoor temperature differ (e.g., by at least a predetermined amount). As a second example, location engine 113 can retrieve the local outdoor humidity for an area and adjust the probability of a wireless terminal being in a building (or vehicle) if the humidity measured by the wireless terminal and the outdoor humidity differ (e.g., by at least a predetermined amount).

In addition, as those who are skilled in the art will appreciate after reading this specification, location engine 113 can also use the barometric pressure measurements provided by wireless terminal 101 to determine the particular type of building that the wireless terminal is within. For example, location engine 113 can compare the change in outside pressure over time and the delay in corresponding pressure change within the building, wherein the delay in the in-building pressure change can be determined from the barometric measurements provided by the wireless terminal known or estimated to be inside a building. Estimating the particular type of building can be used to refine further the results of task 1501 and/or task 1503, for example and without limitation.

Figure 16:
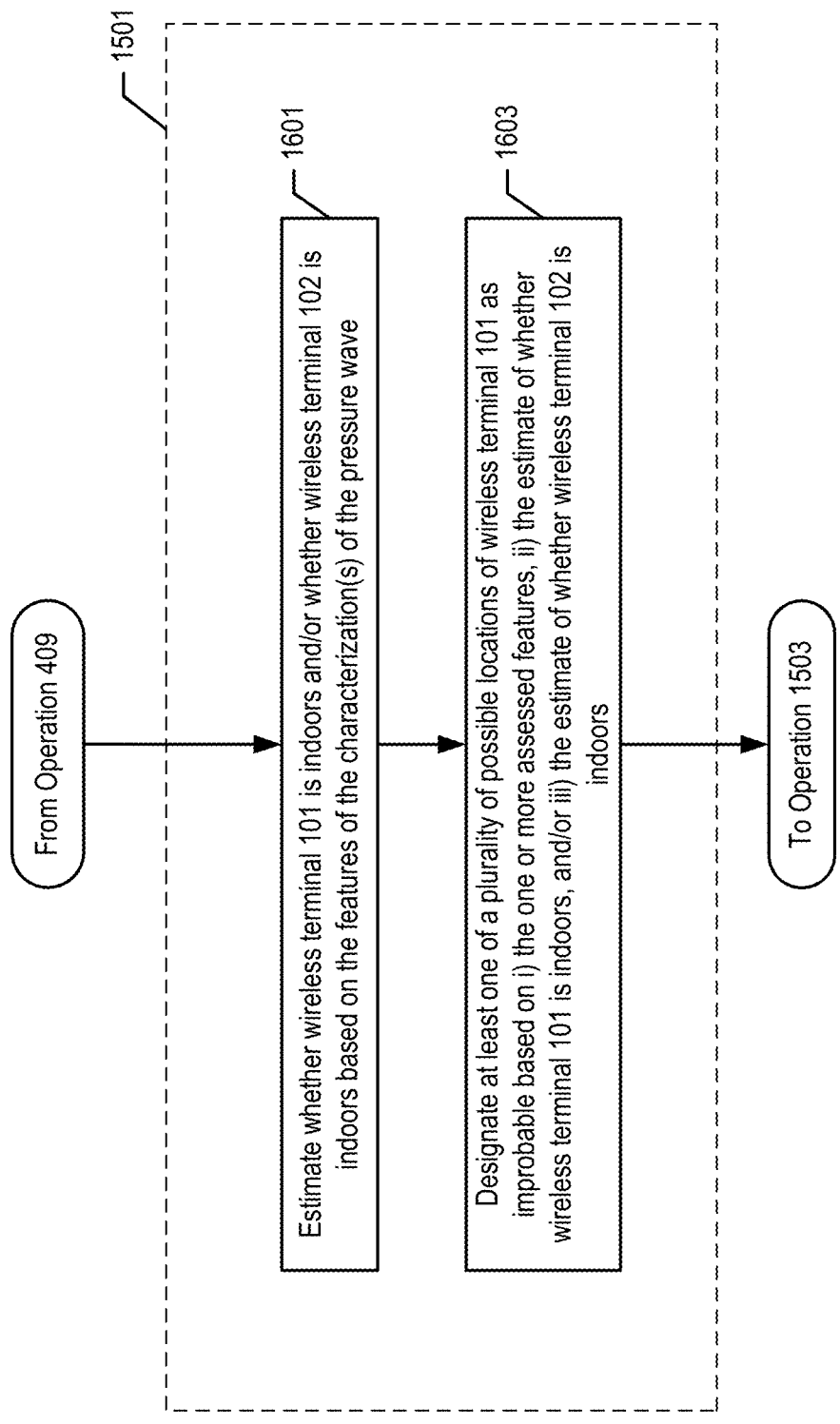
FIG. 16 depicts a flowchart of the salient processes performed in accordance with task 1501.

Task 1501: Designate at Least One of the Plurality of Possible Locations of Wireless Terminal as Improbable Based on the Measurement of Barometric Pressure—FIG. 16 depicts a flowchart of the salient processes performed in accordance with task 1501.

At task 1601, location engine 113 generates an estimate of whether wireless terminal 101 is indoors or outdoors, based on one or more features of the characterization of the pressure wave in the vicinity of terminal 101 being present, as assessed at task 1205. For example, a wireless terminal that is outside of a building (e.g., wireless terminal 131 in FIG. 8A) does not experience (i.e., "see") a transient in a pressure wave, but a wireless terminal that is in the building might "see" the transient; thus, the disclosed technique can be regarded as an inbuilding detection system. Furthermore, because the pressure wave changes character depending on where the pressure wave is measured, location engine 113 can use the characterization of the pressure wave to determine where the wireless terminal is, at least with respect to the source of the pressure wave (e.g., "near the entry door", "far from the entry door", "next to an elevator" as is the case for wireless terminal 102 in FIGS. 8A and 8B, "on the third floor" as is the case for wireless terminal 101 in FIG. 8B, etc.).

Location engine 113, in some embodiments of the present invention, generates an estimate of whether wireless terminal 101 is indoors or outdoors, based on one or more features of the characterization of the pressure wave in the vicinity of a different wireless terminal (e.g., wireless terminal 102, etc.). For example and without limitation, if the transient of the pressure wave (and/or other components of the pressure wave) in the vicinity of wireless terminal 101 matches in some predetermined way to the transient (and/or other components) of the pressure wave in the vicinity of wireless terminal 102, and wireless terminal 102 is estimated or known to be indoors (or outdoors), then one might infer that wireless terminal 101 is also indoors (or outdoors).

As another example, if the pressure changes detected in a building by wireless terminal 101 over a predetermined period (e.g., 10 minutes, etc.) deviate according to a predetermined characteristic (e.g., the rate of change, etc.) from what is being detected by one or more terminals that are known to be outdoors (e.g., terminal 102 if outdoors), then one can infer that terminal 101 is indoors. This can be due to the building acting as a giant pressure attenuator. If the weather changes in pressure at one rate outside, it might increase or decrease more slowly inside a tight building.

In some embodiments of the present invention, location engine 113 also estimates a probability that the wireless terminal is correctly classified as indoors (or outdoors), in well-known fashion. For example and without limitation, the estimated probability can be based on where a decision threshold is set in relation to one or more cumulative distribution functions, which dictate how likely it is that the wireless terminal is outdoors when it is decided that the wireless terminal is indoors, and vice-versa. This is further described, for example and without limitation, in U.S. Pat. No. 9,332,389, which is incorporated herein by reference.

As those who are skilled in the art will appreciate, after reading this specification, the rest of the location estimation process can be based on the probability estimate generated. For example, the location estimation can react one way if the estimated probability of the wireless terminal being indoors is 95%, while the location estimation can react a different way if the estimated probability is 50%.

In some embodiments of the present invention, location engine 113 bases the estimate of the probability that a wireless terminal is indoors, on whether the transient correlates to one or more occurrences of a predetermined event. The predetermined event can be, for example and without limitation, a door (e.g., building entry door, internal door, elevator door, etc.) opening and or closing. In some embodiments, location engine 113 determines whether the transient correlates to an event taking place in, or being tracked by, an independent system such as, for example and without limitation, a security log that tracks when a particular door has been opened and/or closed in a building; the location engine can determine whether a time in such an independent system matches or correlates to the time that the transient occurs, allowing for any propagation delay of the pressure wave.

At task 1603, location engine 113 designates at least one of a plurality of possible locations of wireless terminal 101 as improbable based on one more of i) the one or more features assessed as being present in task 1205, ii) the estimate of whether wireless terminal 101 is indoors, and/or iii) the estimate of whether wireless terminal 102 is indoors.

Figure 17:
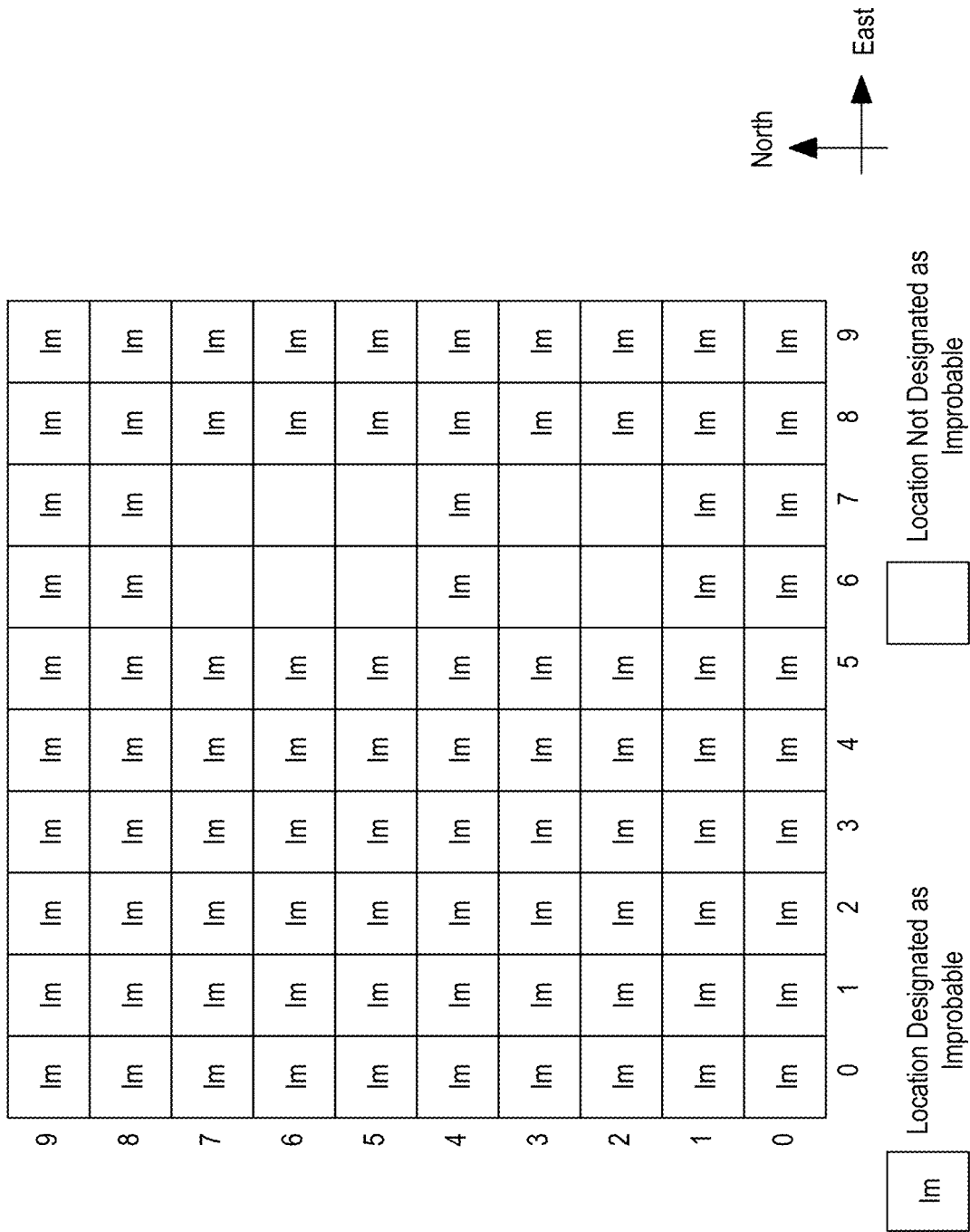
FIG. 17 depicts an illustrative map of the locations in geographic region 120 that are designated as improbable and those that are not.

Location server 113 can designate a location as improbable based on an estimate of wireless terminal 101 being outdoors, when the location is known to be indoors. The theory underlying this test is when the terminal is estimated to be outdoors, any indoor location is considered to be invalid. Similarly, location server 113 can designate a location as improbable based on an estimate of wireless terminal 101 being indoors, when the location is known to be outdoors. The theory underlying this test is when the terminal is estimated to be indoors, any outdoor location is considered to be invalid. FIG. 17 depicts an illustrative map of the locations in geographic region 120 that are designated as improbable and those that are not, and corresponds to the scenario in which wireless terminal 101 has been estimated as being indoors.

Figure 18:
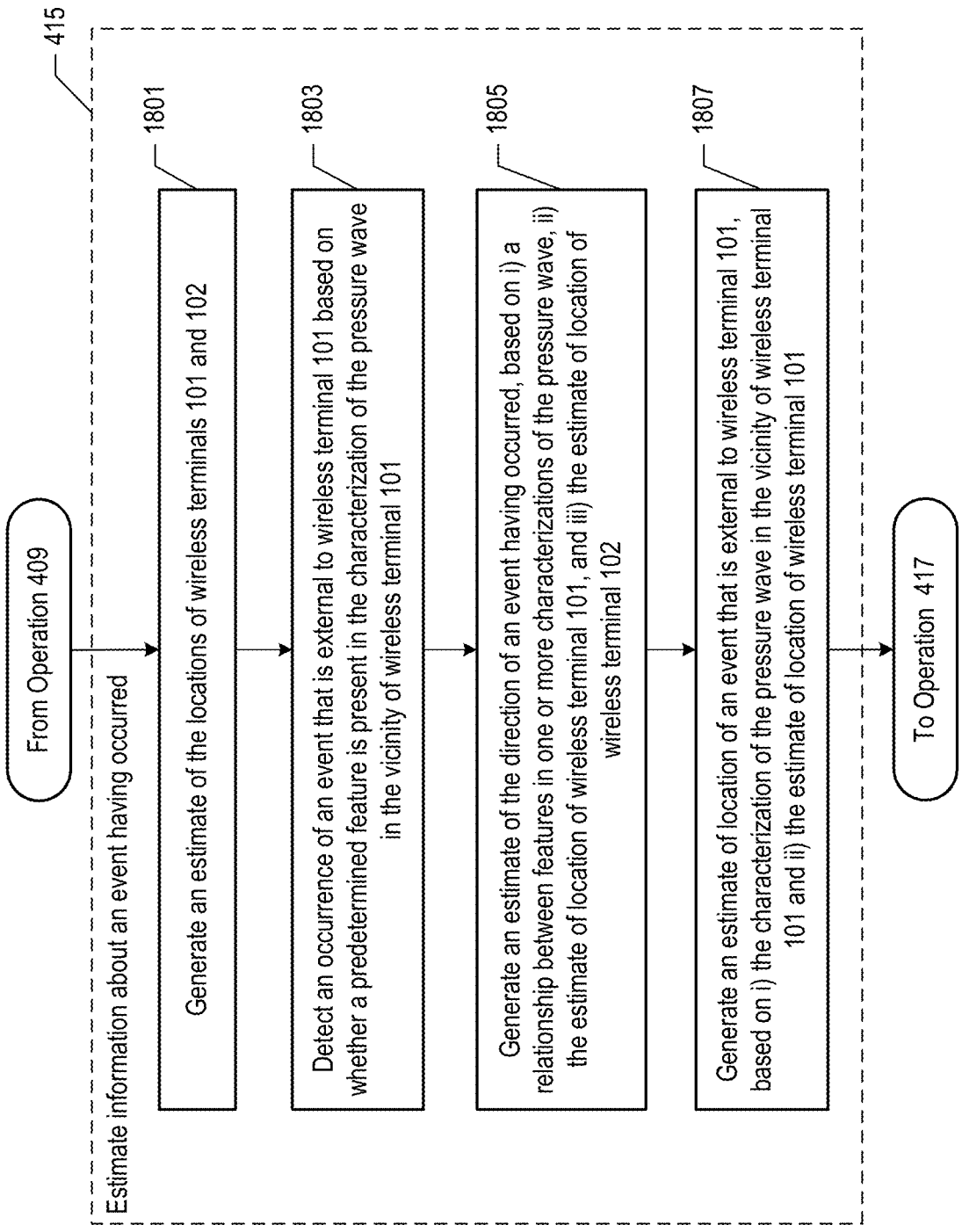
FIG. 18 depicts a flowchart of the salient processes performed in accordance with task 415.

Task 415: Estimate Information About an Event Having Occurred—FIG. 18 depicts a flowchart of the salient processes performed in accordance with task 415.

At task 1801, location engine 113 generates an estimate of the location of wireless terminal 101. In some embodiments of the present invention, location engine 113 generates an estimate of the location of other wireless terminals (e.g., wireless terminal 102, etc.). Location engine 113 can estimate the location of the wireless terminal in accordance with task 411 or in accordance with a different technique.

At task 1803, location engine 113 detects an occurrence of an event based on whether a predetermined feature (e.g., a transient, etc.) having a predetermined characteristic is present in the characterization of the pressure wave in the vicinity of wireless terminal 101, as determined at task 1205. In some embodiments of the present invention, the event is external to wireless terminal 101, meaning that the event comes from or derives from a source outside the wireless terminal.

The event can be, for example and without limitation, the opening and/or closing of a door or other activity (e.g., building entry door, internal door, elevator operation, etc.). As those who are skilled in the art will appreciate after reading this specification, the event can be any other type of occurrence that gives off a pressure wave such as, while not being limited to, a gunshot, an explosion, a loud or sudden noise, the cycling on and/or off of an HVAC system, the operation of manufacturing equipment, and so on, and the source of the event can be any object that is capable of producing such a pressure wave. Furthermore, as those who are skilled in the art will appreciate after reading this specification, the source of a pressure wave need not be confined to being within a building or even indoors; for example and without limitation, the source can be within an airplane, a bus, a train, or a different type of vehicle, vessel, structure, and so forth, having a self-contained space. In some cases, the source of the pressure wave can be outdoors and/or the pressure wave can propagate outdoors.

Location engine 113 can also detect that a particular event has occurred, based on the characterization of the pressure wave. To do so, the location engine can match the characterization with one or more known patterns of events that can take place in the environment in which the wireless terminal is located. Furthermore, the location estimate generated at task 1801 can be used to narrow down the possible events that might have taken place. For instance, if the characterization of the pressure wave suggests that an elevator door has opened or that the elevator is being operated, and the estimate of wireless terminal 101's location has the terminal in the vicinity of the elevator at the front of the building, then location engine 113 can infer that the front elevator, and not the back elevator, was operated.

FIGS. 19A and 19B depict illustrative locations of wireless terminals 101, 102, 131, and 132 in and around building 602. Because the pressure waves experienced by these different wireless terminals can be different from one another, location engine 113 uses characterizations of the pressure wave in the vicinities of the wireless terminals to estimate various types of information.

In some embodiments of the present invention, location engine 113 detects an occurrence of an event based on whether a predetermined feature (e.g., a transient, etc.) having a predetermined characteristic is present in the characterizations of the pressure wave in the vicinities of multiple wireless terminals (e.g., wireless terminals 101 and 102, etc.).

In some embodiments of the present invention, location engine 113 detects the occurrence of the event, based on a propagation characteristic of the pressure wave. For example and without limitation, the location engine can account for the speed of the pressure wave and estimate the time at which the event occurred, in contrast to the time at which the transient corresponding to the event arrived at the wireless terminal measuring the pressure wave. Moreover, location engine 113 can corroborate and/or correlate the event time that was estimated based on data from wireless terminal 101 with event times that were estimated based on data from other terminals (e.g., wireless terminal 102, etc.).

A first example involves elevator 801 being operated and, consequently, producing a pressure wave (e.g., via the plunger-type movement of the elevator car in the shaft, via its door being operated, etc.). Location engine 113 uses characterization 1901 of the pressure wave in the vicinity of wireless terminal 102, as the pressure wave propagates directly from the elevator door, in order to determine that an elevator is being operated (i.e., elevator car moving up or down, creating a plunger effect in the elevator shaft and, consequently, creating a specific pressure signature). This is because an elevator in building 602 is known to produce a different set of features (i.e., a different pattern) in its pressure wave than, for example, building entry door 803. Additionally, a location of wireless terminal 102 can be inferred, by determining that because it is detecting a transient pattern that matches that of an elevator, in which the transient has sufficient enough peak amplitude, the terminal is probably near elevator 801.

A second example involves entry door 804 being operated and, consequently, producing a pressure wave. Location engine 113 uses
i) characterization 1902 of the pressure wave in the vicinity of wireless terminal 131, as it propagates directly from door 804 and ii) characterization 1903 of the pressure wave in the vicinity of wireless terminal 101, as it propagates out of stairwell 802 (from the ground floor depicted in map 602-1), in order to determine that an entry door has been opened and/or closed. This is because an entry door in building 602 is known to produce a different set of features (i.e., a different pattern) in its pressure wave than, for instance, elevator 801. Furthermore, engine 113 can determine through features in the characterizations of the pressure wave that door 804 is the entry door being operated. The probative features in the characterizations include one or more of i) the timing of when the transients occur at each detecting wireless terminal (i.e., terminals 131 and 101) as the pressure wave propagates through building 602, ii) the relatively large peak amplitude of the transient in characterization 1902 detected by wireless terminal 131 known to be near door 804, and iii) the lack of a relevant transient being detected by wireless terminal 132 that is known to be distant from door 804.

At task 1805, location engine 113 generates an estimate of the direction in which the detected event occurred, based on a relationship between i) a predetermined feature in the characterization of the pressure wave in the vicinity of wireless terminal 101 and ii) a predetermined feature in the characterization of the pressure wave in the vicinity of wireless terminal 102. For example and without limitation, location engine 113 can determine the times, relative to a common time reference, at which the feature, such as a transient as detected in accordance with task 1205, propagates past each wireless terminal and can then trilaterate accordingly the direction in which the event occurred. Location engine 113 also bases the estimate of the direction of the event on the locations of wireless terminals 101 and 102. In doing so, the location engine establishes a frame of reference with respect to each other (i.e., to estimate direction in relation to the wireless terminals) or a frame of reference with respect to a ground reference (i.e., to estimate direction in relation to the ground reference).

In some embodiments of the present invention, location engine 113 accounts for the speed, or other propagation characteristic, of the pressure wave in order to refine the estimate of the direction of the event. For example, engine 113 can apply trilateration to determine the distance to the source of the event from each of multiple wireless terminals, by accounting for both i) the times at which the event is experienced (i.e., propagates by) by each terminal and ii) the speed at which the pressure wave propagates. By applying trilateration in this way, engine 113 can estimate the direction of the source of the event, and also the location of the source. It can also be used to locate or identify new location markers and use them in future location estimations, based upon a pressure signature that is new to that area and located by multiple wireless terminals.

Location engine 113 can also use the estimate of direction in order to determine which particular event has occurred. For instance, suppose that a characterization of the pressure wave suggests that an elevator door has opened at that an elevator has been operated, but there are many elevators and elevator doors throughout a building that generate similar pressure waves. In this case, engine 113 can use the estimate of the direction in which the event occurred in order to infer that the door of an elevator in the back of the building, and not in the front, has opened, at that a particular elevator has been operated.

At task 1807, location engine 113 generates an estimate of the location of the source of the detected event. The estimate of location of the source can be expressed as being "indoors", "outdoors", "in a room", "on a building floor", "next to a wireless terminal", or in terms of geo-coordinates, for example and without limitation. The location engine bases the estimate on at least i) the characterization of the pressure wave in the vicinity of wireless terminal 101, as assessed at task 1205, and ii) the estimate of location of wireless terminal 101, as generated at task 1801. For example, location engine 113 can use one or more features in the characterization, such as the peak amplitude of a transient, in order to determine the proximity of terminal 101 to the source of the event. In the example, if the location engine determines terminal 101 to be nearby the source of the event (e.g., an elevator, etc.), then it can infer the source's location as being approximately that of the wireless terminal.

Location engine can further refine the estimate of the source's location, based on i) a relationship between multiple characterizations of the pressure wave in the vicinities of multiple wireless terminals and ii) the locations of said terminals. For example and without limitation, location engine 113 can determine the times, relative to a common time reference, at which the feature, such as a transient as detected in accordance with task 1205, propagates past each wireless terminal (e.g., three or more, etc.) and can then trilaterate accordingly the source of the event.

In some embodiments of the present invention, location engine 113 accounts for the speed, or other propagation characteristic(s), of the pressure wave in order to refine the location estimate of the source of the event.

Location engine 113 can also use the location estimate in order to determine which particular event has occurred. For instance, suppose that a characterization of the pressure wave suggests that an elevator door has opened at that an elevator is being operated, but there are many elevators or elevator doors throughout a building that generate similar pressure waves. In this case, engine 113 can use the estimate of the location of the source in order to infer that an elevator in the back of the building, and not in the front, was operated.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method of estimating the location of a wireless terminal, the method comprising:
   receiving, by a data processing system, the identity of a radio signal that is received by a wireless terminal;
   receiving, by the data processing system, a sample of barometric pressure measured by the wireless terminal;
   generating, by the data-processing system, a characterization of a pressure wave in the vicinity of the wireless terminal based on the sample of barometric pressure measured by the wireless terminal;
   designating at least one of a plurality of possible locations of the wireless terminal as improbable based on:
   whether a predetermined feature is present in the characterization of the pressure wave; and
   estimating the location of the wireless terminal to be one of the plurality of possible locations of the wireless terminal not designated as improbable based on:
   the identity of the radio signal, and
   a propagation characteristic of the pressure wave, wherein the propagation characteristic of the pressure wave is its speed of propagation.

2. The method of claim 1, further comprising:
   receiving, by the data processing system, a measurement of a location-dependent trait of a radio signal as received by the wireless terminal; and
   wherein estimating the location of the wireless terminal to be one of the plurality of possible locations of the wireless terminal not designated as improbable is also based on:
   the measurement of the location-dependent trait of the radio signal.

3. The method of claim 2, wherein the predetermined feature is a transient having a predetermined characteristic.

4. The method of claim 2, wherein all of the plurality of possible locations of the wireless terminal not designated as improbable are indoors.

5. The method of claim 1, further comprising inferring the speed of propagation of the pressure wave, by characterizing a transient that is present in the pressure wave.

6. A method of estimating the location of a wireless terminal, the method comprising:
   receiving, by a data processing system, a measurement of a location-dependent trait of a radio signal as received by a wireless terminal;
   receiving, by the data processing system, a sample of barometric pressure measured by the wireless terminal;
   generating, by the data-processing system, a characterization of a pressure wave in the vicinity of the wireless terminal based on the sample of barometric pressure measured by the wireless terminal;
   designating at least one of a plurality of possible locations of the wireless terminal as improbable based on:
   whether a predetermined feature is present in the characterization of the pressure wave; and
   estimating the location of the wireless terminal to be one of the plurality of possible locations of the wireless terminal not designated as improbable based on:
   the measurement of the location-dependent trait of the radio signal, and
   a propagation characteristic of the pressure wave, wherein the propagation characteristic of the pressure wave is its speed of propagation.

7. The method of claim 6, wherein the step of estimating the location of the wireless terminal comprises:
   comparing the measurement of the location-dependent trait of the radio signal to:
   a) a first expected value of the location-dependent trait of the radio signal at a first location, and
   b) a second expected value of the location-dependent trait of the radio signal at a second location.

8. The method of claim 6, wherein the predetermined feature is a transient having a predetermined characteristic.

9. The method of claim 6, wherein all of the plurality of possible locations of the wireless terminal not designated as improbable are indoors.

10. The method of claim 6, further comprising inferring the speed of propagation of the pressure wave, by characterizing a transient that is present in the pressure wave.

11. A method of estimating the location of a wireless terminal, the method comprising:
    receiving, by a data processing system, a sample of barometric pressure measured by a wireless terminal;
    generating, by the data-processing system, a characterization of a pressure wave in the vicinity of the wireless terminal based on the sample; and
    generating, by the data-processing system, an estimate of the location of the wireless terminal based on:
    i) the characterization of the pressure wave in the vicinity of the wireless terminal, and
    ii) a propagation characteristic of the pressure wave, wherein the propagation characteristic of the pressure wave is its speed of propagation, and
    iii) the location at which a predetermined event occurs that causes the pressure wave.

12. The method of claim 11, wherein the event comprises at least one of i) an opening of and ii) a closing of a door of a building, wherein the location at which the predetermined event occurs is the location of the door.

13. The method of claim 11, wherein the estimate of the location of the wireless terminal is further based on the time at which a predetermined feature is present in the characterization of the pressure wave, in relation to the time at which the predetermined event occurs.

14. The method of claim 13, wherein the predetermined feature is a transient having a predetermined characteristic.

15. The method of claim 14, wherein the predetermined characteristic is that the peak amplitude of the transient exceeds, by a predetermined amount, at least one of i) a mean value of and ii) median value of a portion of the pressure wave in the vicinity of the first wireless terminal.

16. The method of claim 13, further comprising:
   designating at least one of a plurality of possible locations of the wireless terminal as improbable based on whether the predetermined feature is present in the characterization of the pressure wave;
   wherein the estimate of the location of the wireless terminal is one of the plurality of possible locations of the wireless terminal not designated as improbable.

17. The method of claim 11, further comprising inferring the speed of propagation of the pressure wave, by characterizing a transient that is present in the pressure wave.

\* \* \* \* \*